(12) United States Patent
Acar

(10) Patent No.: US 8,978,475 B2
(45) Date of Patent: Mar. 17, 2015

(54) MEMS PROOF MASS WITH SPLIT Z-AXIS PORTIONS

(75) Inventor: Cenk Acar, Irvine, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 236 days.

(21) Appl. No.: 13/363,537

(22) Filed: Feb. 1, 2012

(65) Prior Publication Data

US 2013/0192364 A1 Aug. 1, 2013

(51) Int. Cl.
*G01P 15/18* (2013.01)

(52) U.S. Cl.
USPC .................. 73/514.32; 73/514.38; 73/510

(58) Field of Classification Search
CPC ............ G01P 15/18; G01P 2015/0848; G01C 19/5712
USPC .................................. 73/514.32, 514.38, 510
See application file for complete search history.

(56) References Cited

U.S. PATENT DOCUMENTS

| | | | |
|---|---|---|---|
| 4,896,156 | A | 1/1990 | Garverick |
| 5,487,305 | A | 1/1996 | Ristic et al. |
| 5,491,604 | A | 2/1996 | Nguyen et al. |
| 5,600,064 | A | 2/1997 | Ward |
| 5,723,790 | A | 3/1998 | Andersson |
| 5,751,154 | A | 5/1998 | Tsugai |
| 5,760,465 | A | 6/1998 | Alcoe et al. |
| 5,765,046 | A | 6/1998 | Watanabe et al. |
| 6,131,457 | A | 10/2000 | Sato |
| 6,214,644 | B1 | 4/2001 | Glenn |
| 6,301,965 | B1 | 10/2001 | Chu et al. |
| 6,351,996 | B1 | 3/2002 | Nasiri et al. |
| 6,366,468 | B1 | 4/2002 | Pan |
| 6,390,905 | B1 | 5/2002 | Korovin et al. |
| 6,501,282 | B1 | 12/2002 | Dummermuth et al. |
| 6,504,385 | B2 | 1/2003 | Hartwell |
| 6,553,835 | B1 | 4/2003 | Hobbs et al. |
| 6,722,206 | B2 | 4/2004 | Takada |
| 6,725,719 | B2 | 4/2004 | Cardarelli |
| 6,781,231 | B2 | 8/2004 | Minervini et al. |
| 6,848,304 | B2 | 2/2005 | Geen |
| 7,051,590 | B1 | 5/2006 | Lemkin et al. |

(Continued)

FOREIGN PATENT DOCUMENTS

| | | |
|---|---|---|
| CN | 1389704 A | 1/2003 |
| CN | 1816747 A | 8/2006 |

(Continued)

OTHER PUBLICATIONS

"U.S. Appl. No. 12/849,742, Non Final Office Action mailed Mar. 28, 2013", 9 pgs.

(Continued)

*Primary Examiner* — John Chapman, Jr.
(74) *Attorney, Agent, or Firm* — Schwegman Lundberg & Woessner, P.A.

(57) ABSTRACT

This document discusses among other things apparatus and methods for a proof mass including split z-axis portions. An example proof mass can include a center portion configured to anchor the proof-mass to an adjacent layer, a first z-axis portion configure to rotate about a first axis using a first hinge, the first axis parallel to an x-y plane orthogonal to a z-axis, a second z-axis portion configure to rotate about a second axis using a second hinge, the second axis parallel to the x-y plane, wherein the first z-axis portion is configured to rotate independent of the second z-axis portion.

18 Claims, 8 Drawing Sheets

(56) References Cited

U.S. PATENT DOCUMENTS

| | | |
|---|---|---|
| 7,054,778 B2 | 5/2006 | Geiger et al. |
| 7,093,487 B2 | 8/2006 | Mochida |
| 7,166,910 B2 | 1/2007 | Minervini et al. |
| 7,202,552 B2 | 4/2007 | Zhe et al. |
| 7,210,351 B2 | 5/2007 | Lo et al. |
| 7,221,767 B2 | 5/2007 | Mullenborn et al. |
| 7,240,552 B2 | 7/2007 | Acar et al. |
| 7,258,011 B2 | 8/2007 | Nasiri et al. |
| 7,258,012 B2 | 8/2007 | Xie et al. |
| 7,266,349 B2 | 9/2007 | Kappes |
| 7,293,460 B2 | 11/2007 | Zarabadi et al. |
| 7,301,212 B1 | 11/2007 | Mian et al. |
| 7,305,880 B2 | 12/2007 | Caminada et al. |
| 7,358,151 B2 | 4/2008 | Araki et al. |
| 7,436,054 B2 | 10/2008 | Zhe |
| 7,449,355 B2 | 11/2008 | Lutz et al. |
| 7,451,647 B2 | 11/2008 | Matsuhisa et al. |
| 7,454,967 B2 | 11/2008 | Skurnik |
| 7,518,493 B2 | 4/2009 | Bryzek et al. |
| 7,539,003 B2 | 5/2009 | Ray |
| 7,544,531 B1 | 6/2009 | Grosjean |
| 7,595,648 B2 | 9/2009 | Ungaretti et al. |
| 7,600,428 B2 | 10/2009 | Robert et al. |
| 7,616,078 B2 | 11/2009 | Prandi et al. |
| 7,622,782 B2 | 11/2009 | Chu et al. |
| 7,706,149 B2 | 4/2010 | Yang et al. |
| 7,781,249 B2 | 8/2010 | Laming et al. |
| 7,795,078 B2 | 9/2010 | Ramakrishna et al. |
| 7,859,352 B2 | 12/2010 | Sutton |
| 7,950,281 B2 | 5/2011 | Hammerschmidt |
| 8,004,354 B1 | 8/2011 | Pu et al. |
| 8,006,557 B2 | 8/2011 | Yin et al. |
| 8,037,755 B2 | 10/2011 | Nagata et al. |
| 8,113,050 B2 | 2/2012 | Acar et al. |
| 8,171,792 B2 | 5/2012 | Sameshima |
| 8,201,449 B2 | 6/2012 | Ohuchi et al. |
| 8,250,921 B2 | 8/2012 | Nasiri et al. |
| 8,375,789 B2 | 2/2013 | Prandi et al. |
| 8,421,168 B2 | 4/2013 | Allen et al. |
| 8,476,970 B2 | 7/2013 | Mokhtar et al. |
| 8,508,290 B2 | 8/2013 | Elsayed et al. |
| 8,710,599 B2 | 4/2014 | Marx et al. |
| 8,739,626 B2 | 6/2014 | Acar |
| 8,742,964 B2 | 6/2014 | Kleks et al. |
| 8,754,694 B2 | 6/2014 | Opris et al. |
| 8,813,564 B2 | 8/2014 | Acar |
| 2002/0021059 A1 | 2/2002 | Knowles et al. |
| 2002/0117728 A1 | 8/2002 | Brosnihhan et al. |
| 2002/0178831 A1 | 12/2002 | Takada |
| 2002/0189352 A1 | 12/2002 | Reeds, III et al. |
| 2002/0196445 A1 | 12/2002 | Mcclary et al. |
| 2003/0038415 A1 | 2/2003 | Anderson et al. |
| 2003/0061878 A1 | 4/2003 | Pinson |
| 2003/0200807 A1 | 10/2003 | Hulsing, II |
| 2003/0222337 A1 | 12/2003 | Stewart |
| 2004/0119137 A1 | 6/2004 | Leonardi et al. |
| 2004/0211258 A1 | 10/2004 | Geen |
| 2004/0219340 A1 | 11/2004 | McNeil et al. |
| 2004/0231420 A1 | 11/2004 | Xie et al. |
| 2004/0251793 A1 | 12/2004 | Matushisa |
| 2005/0005698 A1 | 1/2005 | McNeil et al. |
| 2005/0097957 A1 | 5/2005 | Mcneil et al. |
| 2005/0139005 A1 | 6/2005 | Geen |
| 2005/0189635 A1 | 9/2005 | Humpston et al. |
| 2005/0274181 A1 | 12/2005 | Kutsuna et al. |
| 2006/0032308 A1 | 2/2006 | Acar et al. |
| 2006/0034472 A1 | 2/2006 | Bazarjani et al. |
| 2006/0043608 A1 | 3/2006 | Bernier et al. |
| 2006/0097331 A1 | 5/2006 | Hattori |
| 2006/0137457 A1 | 6/2006 | Zdeblick |
| 2006/0207328 A1 | 9/2006 | Zarabadi et al. |
| 2006/0213265 A1 | 9/2006 | Weber et al. |
| 2006/0213266 A1 | 9/2006 | French et al. |
| 2006/0213268 A1 | 9/2006 | Asami et al. |
| 2006/0246631 A1 | 11/2006 | Lutz et al. |
| 2007/0013052 A1 | 1/2007 | Zhe et al. |
| 2007/0034005 A1 | 2/2007 | Acar et al. |
| 2007/0040231 A1 | 2/2007 | Harney et al. |
| 2007/0042606 A1 | 2/2007 | Wang et al. |
| 2007/0047744 A1 | 3/2007 | Karney et al. |
| 2007/0071268 A1 | 3/2007 | Harney et al. |
| 2007/0085544 A1 | 4/2007 | Viswanathan |
| 2007/0099327 A1 | 5/2007 | Hartzell et al. |
| 2007/0114643 A1 | 5/2007 | DCamp et al. |
| 2007/0165888 A1 | 7/2007 | Weigold |
| 2007/0205492 A1 | 9/2007 | Wang |
| 2007/0220973 A1 | 9/2007 | Acar |
| 2007/0222021 A1 | 9/2007 | Yao |
| 2007/0284682 A1 | 12/2007 | Laming et al. |
| 2008/0049230 A1 | 2/2008 | Chin et al. |
| 2008/0081398 A1 | 4/2008 | Lee et al. |
| 2008/0083958 A1 | 4/2008 | Wei et al. |
| 2008/0083960 A1 | 4/2008 | Chen et al. |
| 2008/0092652 A1 | 4/2008 | Acar |
| 2008/0122439 A1 | 5/2008 | Burdick et al. |
| 2008/0157238 A1 | 7/2008 | Hsiao |
| 2008/0157301 A1 | 7/2008 | Ramakrishna et al. |
| 2008/0169811 A1 | 7/2008 | Viswanathan |
| 2008/0202237 A1 | 8/2008 | Hammerschmidt |
| 2008/0245148 A1 | 10/2008 | Fukumoto |
| 2008/0247585 A1 | 10/2008 | Leidl et al. |
| 2008/0251866 A1 | 10/2008 | Belt et al. |
| 2008/0290756 A1 | 11/2008 | Huang |
| 2008/0302559 A1 | 12/2008 | Leedy |
| 2008/0314147 A1* | 12/2008 | Nasiri et al. ............... 73/514.32 |
| 2009/0064780 A1 | 3/2009 | Coronato et al. |
| 2009/0072663 A1 | 3/2009 | Ayazi et al. |
| 2009/0140606 A1 | 6/2009 | Huang |
| 2009/0166827 A1 | 7/2009 | Foster et al. |
| 2009/0175477 A1 | 7/2009 | Suzuki et al. |
| 2009/0183570 A1 | 7/2009 | Acar et al. |
| 2009/0194829 A1 | 8/2009 | Chung et al. |
| 2009/0263937 A1 | 10/2009 | Ramakrishna et al. |
| 2009/0266163 A1 | 10/2009 | Ohuchi et al. |
| 2010/0019393 A1 | 1/2010 | Hsieh et al. |
| 2010/0024548 A1 | 2/2010 | Cardarelli |
| 2010/0038733 A1 | 2/2010 | Minervini |
| 2010/0044853 A1 | 2/2010 | Dekker et al. |
| 2010/0052082 A1 | 3/2010 | Lee |
| 2010/0058864 A1 | 3/2010 | Hsu et al. |
| 2010/0072626 A1 | 3/2010 | Theuss et al. |
| 2010/0089154 A1 | 4/2010 | Ballas et al. |
| 2010/0122579 A1 | 5/2010 | Hsu et al. |
| 2010/0155863 A1 | 6/2010 | Weekamp |
| 2010/0206074 A1 | 8/2010 | Yoshida et al. |
| 2010/0212425 A1 | 8/2010 | Hsu et al. |
| 2010/0224004 A1 | 9/2010 | Suminto et al. |
| 2011/0030473 A1 | 2/2011 | Acar |
| 2011/0031565 A1 | 2/2011 | Marx et al. |
| 2011/0094302 A1 | 4/2011 | Schofield et al. |
| 2011/0120221 A1 | 5/2011 | Yoda |
| 2011/0121413 A1 | 5/2011 | Allen et al. |
| 2011/0146403 A1 | 6/2011 | Rizzo Piazza Roncoroni et al. |
| 2011/0265564 A1 | 11/2011 | Acar et al. |
| 2011/0285445 A1 | 11/2011 | Huang et al. |
| 2013/0192369 A1 | 8/2013 | Acar et al. |
| 2013/0247666 A1 | 9/2013 | Acar |
| 2013/0247668 A1 | 9/2013 | Bryzek |
| 2013/0250532 A1 | 9/2013 | Bryzek et al. |
| 2013/0257487 A1 | 10/2013 | Opris et al. |
| 2013/0263641 A1 | 10/2013 | Opris et al. |
| 2013/0263665 A1 | 10/2013 | Opris et al. |
| 2013/0265070 A1 | 10/2013 | Kleks et al. |
| 2013/0265183 A1 | 10/2013 | Kleks et al. |
| 2013/0268227 A1 | 10/2013 | Opris et al. |
| 2013/0268228 A1 | 10/2013 | Opris et al. |
| 2013/0269413 A1 | 10/2013 | Tao et al. |
| 2013/0270657 A1 | 10/2013 | Acar et al. |
| 2013/0270660 A1 | 10/2013 | Bryzek et al. |
| 2013/0271228 A1 | 10/2013 | Tao et al. |
| 2013/0277772 A1 | 10/2013 | Bryzek et al. |
| 2013/0277773 A1 | 10/2013 | Bryzek et al. |
| 2013/0298671 A1 | 11/2013 | Acar et al. |

(56) References Cited

U.S. PATENT DOCUMENTS

2013/0328139 A1 12/2013 Acar
2013/0341737 A1 12/2013 Bryzek et al.
2014/0070339 A1 3/2014 Marx

FOREIGN PATENT DOCUMENTS

| | | |
|---|---|---|
| CN | 1948906 A | 4/2007 |
| CN | 101038299 A | 9/2007 |
| CN | 101180516 A | 5/2008 |
| CN | 101270988 A | 9/2008 |
| CN | 101426718 A | 5/2009 |
| CN | 101813480 A | 8/2010 |
| CN | 101858928 A | 10/2010 |
| CN | 102597699 A | 7/2012 |
| CN | 103209922 A | 7/2013 |
| CN | 103210278 A | 7/2013 |
| CN | 103221331 A | 7/2013 |
| CN | 103221332 A | 7/2013 |
| CN | 103221333 A | 7/2013 |
| CN | 103221778 A | 7/2013 |
| CN | 103221779 A | 7/2013 |
| CN | 103221795 A | 7/2013 |
| CN | 103238075 A | 8/2013 |
| CN | 103363969 A | 10/2013 |
| CN | 103363983 A | 10/2013 |
| CN | 103364590 A | 10/2013 |
| CN | 103364593 A | 10/2013 |
| CN | 103368503 A | 10/2013 |
| CN | 103368562 A | 10/2013 |
| CN | 103368577 A | 10/2013 |
| CN | 103376099 A | 10/2013 |
| CN | 103376102 A | 10/2013 |
| CN | 103403495 A | 11/2013 |
| CN | 203275441 U | 11/2013 |
| CN | 203275442 U | 11/2013 |
| CN | 103663344 A | 3/2014 |
| CN | 203719664 U | 7/2014 |
| CN | 104094084 A | 10/2014 |
| CN | 104105945 A | 10/2014 |
| DE | 112011103124 T5 | 12/2013 |
| DE | 102013014881 A1 | 3/2014 |
| EP | 1460380 A1 | 9/2004 |
| EP | 1521086 A1 | 4/2005 |
| EP | 1688705 A2 | 8/2006 |
| EP | 1832841 A1 | 9/2007 |
| EP | 1860402 A1 | 11/2007 |
| EP | 2053413 A1 | 4/2009 |
| EP | 2259019 A1 | 12/2010 |
| JP | 09089927 A | 4/1997 |
| JP | 10239347 A | 9/1998 |
| JP | 2005024310 A | 1/2005 |
| JP | 2005114394 A | 4/2005 |
| JP | 2005294462 A | 10/2005 |
| JP | 2007024864 A | 2/2007 |
| JP | 2008294455 A | 12/2008 |
| JP | 2009075097 A | 4/2009 |
| JP | 2009186213 A | 8/2009 |
| JP | 2010025898 A | 2/2010 |
| JP | 2010506182 A | 2/2010 |
| KR | 1020110055449 A1 | 5/2011 |
| KR | 1020130052652 A | 5/2013 |
| KR | 1020130052653 A | 5/2013 |
| KR | 1020130054441 A | 5/2013 |
| KR | 1020130055693 A | 5/2013 |
| KR | 1020130057485 A | 5/2013 |
| KR | 1020130060338 A | 6/2013 |
| KR | 1020130061181 A | 6/2013 |
| KR | 101311966 B1 | 9/2013 |
| KR | 1020130097209 A | 9/2013 |
| KR | 101318810 B1 | 10/2013 |
| KR | 1020130037462 A | 10/2013 |
| KR | 1020130112789 A | 10/2013 |
| KR | 1020130112792 A | 10/2013 |
| KR | 1020130112804 A | 10/2013 |
| KR | 1020130113385 A | 10/2013 |
| KR | 1020130113386 A | 10/2013 |
| KR | 1020130113391 A | 10/2013 |
| KR | 1020130116189 A | 10/2013 |
| KR | 1020130116212 A | 10/2013 |
| KR | 101332701 B1 | 11/2013 |
| KR | 1020130139914 A | 12/2013 |
| KR | 1020130142116 A | 12/2013 |
| KR | 101352827 B1 | 1/2014 |
| KR | 1020140034713 A | 3/2014 |
| TW | I255341 B | 5/2006 |
| WO | WO-0175455 A2 | 10/2001 |
| WO | WO-2008059757 A1 | 5/2008 |
| WO | WO-2008087578 A2 | 7/2008 |
| WO | WO-2009050578 A2 | 4/2009 |
| WO | WO-2009156485 A1 | 12/2009 |
| WO | WO-2011016859 A2 | 2/2011 |
| WO | WO-2011016859 A3 | 2/2011 |
| WO | WO-2012037492 A2 | 3/2012 |
| WO | WO-2012037492 A3 | 3/2012 |
| WO | WO-2012037501 A2 | 3/2012 |
| WO | WO-2012037501 A3 | 3/2012 |
| WO | WO-2012037536 A2 | 3/2012 |
| WO | WO-2012037537 A2 | 3/2012 |
| WO | WO-2012037538 A2 | 3/2012 |
| WO | WO-2012037539 A1 | 3/2012 |
| WO | WO-2012037539 A9 | 3/2012 |
| WO | WO-2012037540 A2 | 3/2012 |
| WO | WO-2012040194 A1 | 3/2012 |
| WO | WO-2012040211 A2 | 3/2012 |
| WO | WO-2012040245 A2 | 3/2012 |
| WO | WO-2012040245 A3 | 3/2012 |
| WO | WO-2013115967 A1 | 8/2013 |
| WO | WO-2013116356 A1 | 8/2013 |
| WO | WO-2013116514 A1 | 8/2013 |
| WO | WO-2013116522 A1 | 8/2013 |

OTHER PUBLICATIONS

"U.S. Appl. No. 12/849,742, Non Final Office Action mailed Aug. 23, 2012", 9 pgs.

"U.S. Appl. No. 12/849,742, Response filed Jan. 23, 2012 to Non Final Office Action mailed Aug. 23, 2012", 10 pgs.

"U.S. Appl. No. 12/849,787, Response filed Feb. 4, 2013 to Restriction Requirement mailed Oct. 4, 2012", 7 pgs.

"U.S. Appl. No. 12/849,787, Restriction Requirement mailed Oct. 4, 2012", 5 pgs.

"U.S. Appl. No. 13/813,443, Preliminary Amendment mailed Jan. 31, 2013", 3 pgs.

"U.S. Appl. No. 13/821,586, Preliminary Amendment mailed Mar. 8, 2013", 6 pgs.

"U.S. Appl. No. 13/821,589, Preliminary Amendment mailed Mar. 8, 2013", 6 pgs.

"U.S. Appl. No. 13/821,612, Preliminary Amendment mailed Mar. 8, 2013", 3 pgs.

"U.S. Appl. No. 13/821,793, Preliminary Amendment mailed Mar. 8, 2013", 3 pgs.

"U.S. Appl. No. 13/821,842, Preliminary Amendment mailed Mar. 8, 2013", 3 pgs.

"U.S. Appl. No. 13/821,853, Preliminary Amendment mailed Mar. 8, 2013", 3 pgs.

"International Application Serial No. PCT/US2011/052006, International Preliminary Report on Patentability mailed Mar. 28, 2013", 7 pgs.

"International Application Serial No. PCT/US2011/052059, International Preliminary Report on Patentability mailed Jan. 22, 2013", 14 pgs.

"International Application Serial No. PCT/US2011/052060, International Preliminary Report on Patentability mailed Jan. 22, 2013", 12 pgs.

"International Application Serial No. PCT/US2011/052061, International Preliminary Report on Patentability mailed Mar. 28, 2013", 6 pgs.

"International Application Serial No. PCT/US2011/052064, International Preliminary Report on Patentability mailed Mar. 28, 2013", 5 pgs.

(56) References Cited

OTHER PUBLICATIONS

"International Application Serial No. PCT/US2011/052065, International Preliminary Report on Patentability mailed Mar. 28, 2013", 7 pgs.

"International Application Serial No. PCT/US2011/052417, International Preliminary Report on Patentability mailed Apr. 4, 2013", 6 pgs.

"International Application Serial No. PCT/US2011/052064, Search Report mailed Feb. 29, 2012", 3 pgs.

"International Application Serial No. PCT/US2011/052064, Written Opinion mailed Feb. 29, 2012", 3 pgs.

"International Application Serial No. PCT/US2011/052065, International Search Report mailed Apr. 10, 2012", 3 pgs.

"International Application Serial No. PCT/US2011/052065, Written Opinion mailed Apr. 10, 2012", 5 pgs.

"U.S. Appl. No. 12/849,742, Response filed Sep. 30, 2013 to Non-Final Office Action mailed Mar. 28, 2013", 12 pgs.

"U.S. Appl. No. 12/849,787, Response filed Oct. 28, 2013 to Non Final Office Action mailed May 28, 2013", 12 pgs.

"Chinese Application Serial No. 201180053926.1, Amendment filed Aug. 21, 2013", w/English Translation, 13 pgs.

"Chinese Application Serial No. 201180055309.5, Voluntary Amendment filed Aug. 23, 2013", w/English Translation, 13 pgs.

"Chinese Application Serial No. 201320165465.3, Office Action mailed Jul. 22, 2013", w/English Translation, 2 pgs.

"Chinese Application Serial No. 201320165465.3, Response filed Aug. 7, 2013 to Office Action mailed Jul. 22, 2013", w/English Translation, 39 pgs.

"Chinese Application Serial No. 201320171504.0, Office Action mailed Jul. 22, 2013", w/English Translation, 3 pgs.

"Chinese Application Serial No. 201320171504.0, Response filed Jul. 25, 2013 to Office Action mailed Jul. 22, 2013", w/English Translation, 33 pgs.

"Chinese Application Serial No. 201320171616.6, Office Action mailed Jul. 10, 2013", w/English Translation, 2 pgs.

"Chinese Application Serial No. 201320171757.8, Office Action mailed Jul. 11, 2013", w/English Translation, 2 pgs.

"Chinese Application Serial No. 201320171757.8, Response filed Jul. 25, 2013 to Office Action mailed Jul. 11, 2013", w/English Translation, 21 pgs.

"Chinese Application Serial No. 201320171757.8, Response filed Jul. 26, 2013 to Office Action mailed Jul. 10, 2013", w/English Translation, 40 pgs.

"Chinese Application Serial No. 201320172128.7, Office Action mailed Jul. 12, 2013", w/English Translation, 3 pgs.

"Chinese Application Serial No. 201320172128.7, Response filed Aug. 7, 2013 to Office Action mailed Jul. 12, 2013", w/English Translation, 39 pgs.

"Chinese Application Serial No. 201320172366.8, Office Action mailed Jul. 9, 2013", w/English Translation, 3 pgs.

"Chinese Application Serial No. 201320172366.8, Response filed Sep. 16, 2013 to Office Action mailed Jul. 9, 2013", w/English Translation, 24 pgs.

"Chinese Application Serial No. 201320172367.2, Office Action mailed Jul. 9, 2013", w/English Translation, 2 pgs.

"Chinese Application Serial No. 201320172367.2, Response filed Sep. 16, 2013 to Office Action mailed Jul. 9, 2013", w/English Translation, 24 pgs.

"Chinese Application Serial No. 201320185461.1, Office Action mailed Jul. 23, 2013", w/English Translation, 3 pgs.

"Chinese Application Serial No. 201320185461.1, Response filed Sep. 10, 2013 to Office Action mailed Jul. 23, 2013", w/English Translation, 25 pgs.

"Chinese Application Serial No. 201320186292.3, Office Action mailed Jul. 19, 2013", w/English Translation, 2 pgs.

"Chinese Application Serial No. 201320186292.3, Response filed Sep. 10, 2013 to Office Action mailed Jul. 19, 2013", w/English Translation, 23 pgs.

"European Application Serial No. 13001692.6, European Search Report mailed Jul. 24, 2013", 5 pgs.

"European Application Serial No. 13001696.7, Extended European Search Report mailed Aug. 6, 2013", 4 pgs.

"European Application Serial No. 13001721.3, European Search Report mailed Jul. 18, 2013", 9 pgs.

"Korean Application Serial No. 10-2013-7009775, Office Action mailed Sep. 17, 2013", w/English Translation, 6 pgs.

"Korean Application Serial No. 10-2013-7009777, Office Action mailed Sep. 17, 2013", w/English Translation, 8 pgs.

"Korean Application Serial No. 10-2013-7009788, Office Action mailed Aug. 29, 2013", w/English Translation, 6 pgs.

"Korean Application Serial No. 10-2013-7009790, Office Action mailed Jun. 26, 2013", W/English Translation, 7 pgs.

"Korean Application Serial No. 10-2013-7009790, Response filed Aug. 26, 2013 to Office Action mailed Jun. 26, 2013", w/English Claims, 11 pgs.

"Korean Application Serial No. 10-2013-7010143, Office Action mailed May 28, 2013", w/English Translation, 5 pgs.

"Korean Application Serial No. 10-2013-7010143, Response filed Jul. 24, 2013 to Office Action mailed May 28, 2013", w/English Claims, 14 pgs.

Ferreira, Antoine, et al., "A Survey of Modeling and Control Techniques for Micro- and Nanoelectromechanical Systems", IEEE Transactions on Systems, Man and Cybernetics—Part C: Applications and Reviews vol. 41, No. 3., (May 2011), 350-364.

Fleischer, Paul E, "Sensitivity Minimization in a Single Amplifier Biquad Circuit", IEEE Transactions on Circuits and Systems. vol. Cas-23, No. 1, (1976), 45-55.

Reljin, Branimir D, "Properties of SAB filters with the two-pole single-zero compensated operational amplifier", Circuit Theory and Applications: Letters to the Editor. vol. 10, (1982), 277-297.

Sedra, Adel, et al., "Chapter 8.9: Effect of Feedback on the Amplifier Poles", Microelectronic Circuits, 5th edition, (2004), 836-864.

Song-Hee, Cindy Paik, "A MEMS-Based Precision Operational Amplifier", Submitted to the Department of Electrical Engineering and Computer Sciences MIT, [Online]. Retrieved from the Internet: <URL: http://dspace.mit.edu/bitstream/handle/1721.1/16682/57138272.pdf? . . . >, (Jan. 1, 2004), 123 pgs.

"Application Serial No. PCT/US2011/052006, International Republished Application mailed Jun. 7, 2012", 1 pg.

"Application Serial No. PCT/US2011/052417, International Republished Application mailed Jun. 7, 2012", 1 pg.

"International Application Serial No. PCT/US2010/002166, International Preliminary Report on Patentability mailed Feb. 16, 2012", 6 pgs.

"International Application Serial No. PCT/US2010/002166, International Search Report mailed Feb. 28, 2011", 3 pgs.

"International Application Serial No. PCT/US2010/002166, Written Opinion mailed Feb. 28, 2011", 4 pgs.

"International Application Serial No. PCT/US2011/051994, International Search Report mailed Apr. 16, 2012", 3 pgs.

"International Application Serial No. PCT/US2011/051994, Written Opinion mailed Apr. 16, 2012", 6 pgs.

"International Application Serial No. PCT/US2011/052006, Search Report mailed Apr. 16, 2012", 3 pgs.

"International Application Serial No. PCT/US2011/052006, Written Opinion mailed Apr. 16, 2012", 5 pgs.

"International Application Serial No. PCT/US2011/052059, Search Report mailed Apr. 20, 2012", 4 pgs.

"International Application Serial No. PCT/US2011/052059, Written Opinion mailed Apr. 20, 2012", 7 pgs.

"International Application Serial No. PCT/US2011/052060, International Search Report Apr. 20, 2012", 3 pgs.

"International Application Serial No. PCT/US2011/052060, Written Opinion mailed Apr. 20, 2012", 7 pgs.

"International Application Serial No. PCT/US2011/052061, International Search Report mailed Apr. 10, 2012", 3 pgs.

"International Application Serial No. PCT/US2011/052061, Written Opinion mailed Apr. 10, 2012", 4 pgs.

"International Application Serial No. PCT/US2011/052369, International Search Report mailed Apr. 24, 2012", 6 pgs.

"International Application Serial No. PCT/US2011/052369, Written Opinion mailed Apr. 24, 2012", 3 pgs.

(56) References Cited

OTHER PUBLICATIONS

"International Application Serial No. PCT/US2011/052417, International Search Report mailed Apr. 23, 2012", 5 pgs.
"International Application Serial No. PCT/US2011/052417, Written Opinion mailed Apr. 23, 2012", 4 pgs.
Beyne, E, et al., "Through-silicon via and die stacking technologies for microsystems-integration", IEEE International Electron Devices Meeting, 2008. IEDM 2008., (Dec. 2008), 1-4.
Cabruja, Enric, et al., "Piezoresistive Accelerometers for MCM-Package—Part II", The Packaging Journal of Microelectromechanical Systems. vol. 14, No. 4, (Aug. 2005), 806-811.
Ezekwe, Chinwuba David, "Readout Techniques for High-Q Micromachined Vibratory Rate Gyroscopes", Electrical Engineering and Computer Sciences University of California at Berkeley, Technical Report No. UCB/EECS-2007-176, http://www.eecs.berkeley.edu/Pubs/TechRpts/2007/EECS-2007-176.html, (Dec. 21, 2007), 94 pgs.
Rimskog, Magnus, "Through Wafer Viw Technolog for MEMS and 3D Intergration", Electronic Manufacturing Tecnology Smposium, (Oct. 2007), pp. 286-289.
"U.S. Appl. No. 12/849,787, Non Final Office Action mailed May 28, 2013", 18 pgs.
"U.S. Appl. No. 12/947,543, Notice of Allowance mailed Dec. 17, 2012", 11 pgs.
"U.S. Appl. No. 13/821,598, Preliminary Amendment mailed Mar. 8, 2013", 7 pgs.
"U.S. Appl. No. 13/821,609, Preliminary Amendment mailed Mar. 8, 2013", 3 pgs.
"U.S. Appl. No. 13/821,619, Preliminary Amendment mailed Mar. 8, 2013", 3 pgs.
"Application Serial No. PCT/US2011/051994, International Republished Application mailed Jun. 7, 2012", 1 pg.
"DigiSiMic™ Digital Silicon Microphone Pulse Part No. TC100E", TC100E Datasheet version 4.2 DigiSiMic™ Digital Silicon Microphone. (Jan. 2009), 6 pgs.
"EPCOS MEMS Microphone With TSV", 1 pg.
"International Application Serial No. PCT/US2011/051994, International Preliminary Report on Patentability mailed Mar. 28, 2013", 8 pgs.
"International Application Serial No. PCT/US2011/052340, International Preliminary Report on Patentability mailed Apr. 4, 2013", 5 pgs.
"International Application Serial No. PCT/US2011/052340, Search Report mailed Feb. 29, 2012", 3 pgs.
"International Application Serial No. PCT/US2011/052340, Written Opinion mailed Feb. 29, 2012", 3 pgs.
"International Application Serial No. PCT/US2011/052369, International Preliminary Report on Patentability mailed Apr. 4, 2013", 5 pgs.
"International Application Serial No. PCT/US2013/021411, International Search Report mailed Apr. 30, 2013", 5 pgs.
"International Application Serial No. PCT/US2013/021411, Written Opinion mailed Apr. 30, 2013", 5 pgs.
"International Application Serial No. PCT/US2013/023877, International Search Report mailed May 14, 2013", 3 pgs.
"International Application Serial No. PCT/US2013/023877, Written Opinion mailed May 14, 2013", 5 pgs.
"International Application Serial No. PCT/US2013/024149, Written Opinion mailed", 4 pages.
"International Application Serial No. PCT/US2013/024149, International Search Report mailed", 7 pages.
"T4020 & T4030 MEMS Microphones for Consumer Electronics", Product Brief 2010, Edition Feb. 2010, (2010), 2 pgs.
Acar, Cenk, et al., "Chapter 4: Mechanical Design of MEMS Gyroscopes", MEMS Vibratory Gyroscopes: Structural Approaches to Improve Robustness, Springer, (2009), 73-110.
Acar, Cenk, et al., "Chapter 6: Linear Multi DOF Architecture—Sections 6.4 and 6.5", MEMS Vibratory Gyroscopes: Structural Approaches to Improve Robustness, Springer, (2009), 158-178.

Acar, Cenk, et al., "Chapter 7: Torsional Multi-DOF Architecture", MEMS Vibratory Gyroscopes: Structural Approaches to Improve Robustness, Springer, (209), 187-206.
Acar, Cenk, et al., "Chapter 8: Distributed-Mass Architecture", MEMS Vibratory Gyroscopes: Structural Approaches to Improve Robustness, Springer, (2009), 207-224.
Acar, Cenk, et al., "Chapter 9: Conclusions and Future Trends", MEMS Vibratory Gyroscopes: Structural Approaches to Improve Robustness, Springer, (2009), 225-245.
Krishnamurthy, Rajesh, et al., "Drilling and Filling, but not in your Dentist's Chair a look at some recent history of multi-chip and through silicon via (TSV) technology", Chip Design Magazine, (Oct./Nov. 2008), 7 pgs.
"U.S. Appl. No. 12/849,742, Notice of Allowance mailed Nov. 29, 2013", 7 pgs.
"U.S. Appl. No. 12/849,742, Supplemental Notice of Allowability mailed Mar. 17, 2014", 3 pgs.
"U.S. Appl. No. 12/849,742, Supplemental Notice of Allowability mailed May 5, 2014", 2 pgs.
"U.S. Appl. No. 12/849,787, Notice of Allowance mailed Dec. 11, 2013", 9 pgs.
"U.S. Appl. No. 12/849,787, Supplemental Notice of Allowability mailed Mar. 21, 2014", 3 pgs.
"U.S. Appl. No. 13/362,955, Non Final Office Action mailed Apr. 15, 2014", 9 pgs.
"U.S. Appl. No. 13/362,955, Response filed Feb. 17, 2014 to Restriction Requirement mailed Dec. 17, 2013", 9 pgs.
"U.S. Appl. No. 13/362,955, Restriction Requirement mailed Dec. 17, 2013", 6 pgs.
"U.S. Appl. No. 13/742,942, Notice of Allowance mailed Jan. 28, 2014", 9 pgs.
"U.S. Appl. No. 13/742,942, Supplemental Notice of Allowability mailed Apr. 10, 2014", 2 pgs.
"U.S. Appl. No. 13/746,016, Notice of Allowance mailed Jan. 17, 2014", 10 pgs.
"U.S. Appl. No. 13/755,841, Notice of Allowance mailed May 7, 2014", 8 pgs.
"U.S. Appl. No. 13/755,841, Preliminary Amendment filed Oct. 10, 2013", 10 pgs.
"U.S. Appl. No. 13/755,841, Response filed Apr. 21, 2014 to Restriction Requirement mailed Feb. 21, 2014", 7 pgs.
"U.S. Appl. No. 13/755,841, Restriction Requirement mailed Feb. 21, 2014", 6 pgs.
"U.S. Appl. No. 13/821,589, Restriction Requirement mailed Apr. 11, 2014", 10 pgs.
"Chinese Application Serial No. 2010800423190, Office Action mailed Mar. 26, 2014", 10 pgs.
"Chinese Application Serial No. 201180053926.1, Office Action mailed Jan. 13, 2014", 7 pgs.
"Chinese Application Serial No. 201180053926.1, Response filed Apr. 29, 2014 to Office Action mailed Jan. 13, 2014", w/English Claims, 10 pgs.
"Chinese Application Serial No. 201180054796.3, Office Action mailed Jan. 16, 2014", 8 pgs.
"Chinese Application Serial No. 201180055029.4, Office Action mailed Jan. 13, 2014", 7 pgs.
"Chinese Application Serial No. 201180055029.4, Response filed May 27, 2014 to Office Action mailed Jan. 13, 2014", w/English Claims, 29 pgs.
"Chinese Application Serial No. 201180055309.5, Office Action mailed Mar. 31, 2014", w/English Claims, 7 pgs.
"Chinese Application Serial No. 201320172366.8, Office Action mailed Jan. 30, 2014", w/English Claims, 3 pgs.
"Chinese Application Serial No. 201320172366.8, Office Action mailed Oct. 25, 2013", 8 pgs.
"Chinese Application Serial No. 201320172366.8, Response filed Mar. 18, 2014 to Office Action mailed Jan. 30, 2014", w/English Claims, 20 pgs.
"Chinese Application Serial No. 201320172366.8, Response filed Dec. 24, 2013 to Office Action mailed Oct. 25, 2013", 11 pgs.
"Chinese Application Serial No. 201320565239.4, Office Action mailed Jan. 16, 2014", w/English Translation, 3 pgs.

(56) References Cited

OTHER PUBLICATIONS

"Chinese Application Serial No. 201320565239.4, Response filed Mar. 31, 2014 to Office Action mailed Jan. 16, 2014", w/English Claims, 38 pgs.

"European Application Serial No. 10806751.3, Extended European Search Report mailed Jan. 7, 2014", 7 pgs.

"European Application Serial No. 118260070.2, Office Action mailed Mar. 12, 2014", 1 pg.

"European Application Serial No. 11826070.2, Extended European Search Report mailed Feb. 21, 2014", 5 pgs.

"European Application Serial No. 11826071.0, Extended European Search Report mailed Feb. 20, 2014", 6 pgs.

"European Application Serial No. 11826071.0, Office Action mailed Mar. 12, 2014", 1 pg.

"European Application Serial No. 13001692.6, Response filed Apr. 1, 2014 to Extended European Search Report mailed Jul. 24, 2013", 19 pgs.

"European Application Serial No. 13001721.3, Response filed Apr. 7, 2014 to Extended European Search Report mailed Jul. 18, 2013", 25 pgs.

"Korean Application Serial No. 10-2013-0109990, Amendment filed Dec. 10, 2013", 4 pgs.

"Korean Application Serial No. 10-2013-7009775, Office Action mailed Dec. 27, 2013", 8 pgs.

"Korean Application Serial No. 10-2013-7009775, Response filed Oct. 29, 2013 to Office Action mailed Sep. 17, 2013", w/English Claims, 23 pgs.

"Korean Application Serial No. 10-2013-7009777, Office Action mailed Jan. 27, 2014", 5 pgs.

"Korean Application Serial No. 10-2013-7009777, Response filed Apr. 28, 2014", w/English Claims, 19 pgs.

"Korean Application Serial No. 10-2013-7009777, Response filed Nov. 5, 2013 to Office Action mailed Sep. 17, 2013", 11 pgs.

"Korean Application Serial No. 10-2013-7009788, Office Action mailed Dec. 27, 2013", w/English Translation, 10 pgs.

"Korean Application Serial No. 10-2013-7009788, Response filed Oct. 29, 2013 to Office Action mailed Aug. 29, 2013", w/English Claims, 22 pgs.

"U.S. Appl. No. 13/362,955, Response filed Aug. 15, 2014 to Non Final Office Action mailed May 15, 2014", 13 pgs.

"U.S. Appl. No. 13/742,942, Notice of Allowance mailed Jan. 28, 2014", 8 pgs.

"U.S. Appl. No. 13/755,841, Supplemental Notice of Allowability Jun. 27, 2014", 2 pgs.

"U.S. Appl. No. 13/821,586, Restriction Requirement mailed Sep. 22, 2014", 4 pgs.

"U.S. Appl. No. 13/821,589, Non Final Office Action mailed Jul. 9, 2014", 10 pgs.

"U.S. Appl. No. 13/821,589, Response to Restriction Requirement mailed Apr. 11, 2014", 6 pgs.

"U.S. Appl. No. 13/821,598, Restriction Requirement mailed Aug. 15, 2014", 11 pgs.

"U.S. Appl. No. 13/821,612, Non Final Office Action mailed Jul. 23, 2014", 8 pgs.

"U.S. Appl. No. 13/821,853, Non Final Office Action mailed Jul. 30, 2014", 10 pgs.

"U.S. Appl. No. 13/860,761, Non Final Office Action mailed Aug. 19, 2014", 13 pgs.

"Chinese Application Serial No. 2010800423190, Response filed Aug. 11, 2014 to Office Action mailed Mar. 26, 2014", w/English Claims, 11 pgs.

"Chinese Application Serial No. 201180054796.3, Office Action mailed Sep. 4, 2014", 8 pgs.

"Chinese Application Serial No. 201180054796.3, Response filed Jun. 30, 2014 to Office Action mailed Jan. 16, 2014", w/English Claims, 3 pgs.

"Chinese Application Serial No. 201180055029.4, Office Action mailed Jul. 2, 2014", w/English Translation, 5 pgs.

"Chinese Application Serial No. 201180055309.5, Response filed Aug. 13, 2014 to Office Action mailed Mar. 31, 2014", w/English Claims, 27 pgs.

"Chinese Application Serial No. 201310118845.6, Office Action mailed Sep. 9, 2014", 8 pgs.

"Chinese Application Serial No. 201310119472.4, Office Action mailed Sep. 9, 2014", 7 pgs.

"Chinese Application Serial No. 201380007588.7, Notification to Make Rectification mailed Aug. 18, 2014", 2 pgs.

"Chinese Application Serial No. 201380007615.0, Notification to Make Rectification mailed Aug. 18, 2014", 2 pgs.

"European Application Serial No. 10806751.3, Response filed Jul. 24, 2014 to Office Action mailed Jan. 24, 2014", 26 pgs.

"European Application Serial No. 11826068.6, Extended European Search Report mailed Jul. 16, 2014", 10 pgs.

"European Application Serial No. 13001719.7, Extended European Search Report mailed Jun. 24, 2014", 10 pgs.

"International Application Serial No. PCT/US2013/021411, International Preliminary Report on Patentability mailed Aug. 14, 2014", 7 pgs.

"International Application Serial No. PCT/US2013/023877, International Preliminary Report on Patentability mailed Aug. 14, 2014", 7 pgs.

"International Application Serial No. PCT/US2013/024138, International Preliminary Report on Patentability mailed Aug. 14, 2014", 6 pgs.

"International Application Serial No. PCT/US2013/024149, International Preliminary Report on Patentability mailed Aug. 14, 2014", 6 pgs.

Xia, Guo-Ming, et al., "Phase correction in digital self-oscillation drive circuit for improve silicon MEMS gyroscope bias stability", Solid-State and Integrated Circuit Technology (ICSICT), 2010 10th IEEE International Conference on, IEEE, (Nov. 1, 2010), 1416-1418.

"Chinese Application Serial No. 201180055029.4, Response filed Nov. 14, 2014 to Office Action mailed Jul. 2, 2014", w/English Claims, 23 pgs.

"European Application Serial No. 11826067.8, Extended European Search Report mailed Oct. 6, 2014", 10 pgs.

"European Application Serial No. 11826070.2, Response filed Sep. 9, 2014 to Office Action mailed Mar. 12, 2014", 11 pgs.

"European Application Serial No. 11826071.0, Examination Notification Art. 94(3) mailed Dec. 11, 2014", 4 pgs.

"European Application Serial No. 11826071.0, Response filed Sep. 19, 2014 to Office Action mailed Mar. 12, 2014", 20 pgs.

"European Application Serial No. 11827384.6, Extended European Search Report mailed Nov. 12, 2014", 6 pgs.

"European Application Serial No. 13001695.9, European Search Report mailed Oct. 5, 2014", 6 pgs.

Dunn, C, et al., "Efficient linearisation of sigma-delta modulators using single-bit dither", Electronics Letters 31(12), (Jun. 1995), 941-942.

Kulah, Haluk, et al., "Noise Analysis and Characterization of a Sigma-Delta Capacitive Silicon Microaccelerometer", 12th International Conference on Solid State Sensors, Actuators and Microsystems, (2003), 95-98.

Sherry, Adrian, et al., "AN-609 Application Note: Chopping on Sigma-Delta ADCs", Analog Devices, [Online]. Retrieved from the Internet: <URL: http://www.analog.com/static/imported-files/application_notes/AN-609.pdf>, (2003), 4 pgs.

"U.S. Appl. No. 13/362,955, Final Office Action mailed Nov. 19, 2014", 5 pgs.

"U.S. Appl. No. 13/821,586, Response filed Nov. 24, 2014 to Restriction Requirement mailed Sep. 22, 2014", 6 pgs.

"U.S. Appl. No. 13/821,589, Response filed Nov. 10, 2014 to Non Final Office Action mailed Jul. 9, 2014", 15 pgs.

"U.S. Appl. No. 13/821,598, Non Final Office Action mailed Nov. 20, 2014", 9 pgs.-

(56) References Cited

OTHER PUBLICATIONS

"U.S. Appl. No. 13/821,598, Response filed Oct. 15, 2014 to Restriction Requirement mailed Aug. 15, 2014", 8 pgs.
"U.S. Appl. No. 13/821,609, Restriction Requirement mailed Dec. 15, 2014", 7 pgs.
"U.S. Appl. No. 13/821,612, Notice of Allowance mailed Dec. 10, 2014", 8 pgs.
"U.S. Appl. No. 13/821,612, Response filed Oct. 23, 2014 to Non Final Office Action mailed Jul. 23, 2014", 6 pgs.
"U.S. Appl. No. 13/821,853, Response filed Dec. 1, 2014 to Non Final Office Action mailed Jul. 30, 2014", 10 pgs.

* cited by examiner

US 8,978,475 B2

MEMS PROOF MASS WITH SPLIT Z-AXIS PORTIONS

CROSS REFERENCE TO RELATED APPLICATIONS

This application is related to Acar, International Application No. PCT/US2011/052065, entitled "MICROMACHINED MONOLITHIC 3-AXIS GYROSCOPE WITH SINGLE DRIVE," filed on Sep. 18, 2011, which claims the benefit of priority to Acar, U.S. Provisional Patent Application Ser. No. 61/384,245, entitled "MICROMACHINED MONOLITHIC 3-AXIS GYROSCOPE WITH SINGLE DRIVE," filed on Sep. 18, 2010, and to Acar, International Application No. PCT/US2011/052064, entitled "MICROMACHINED 3-AXIS ACCELEROMETER WITH A SINGLE PROOF-MASS," filed on Sep. 18, 2011, which claims the benefit of priority of Acar, U.S. Provisional Patent Application Ser. No. 61/384,246, entitled "MICROMACHINED 3-AXIS ACCELEROMETER WITH A SINGLE PROOF-MASS," filed on Sep. 18, 2010, each of which is hereby incorporated by reference herein in its entirety.

BACKGROUND

Several single-axis or multi-axis micromachined accelerometer structures have been integrated into a system to form various sensors. As the size of such sensors becomes smaller and the desired sensitivity more robust, small scale stresses on certain components of the accelerometer can detract from the accuracy of the sensors.

OVERVIEW

This document discusses, among other things, apparatus and methods for a proof mass including split z-axis portions. An example proof mass can include a center portion configured to anchor the proof-mass to an adjacent layer, a first z-axis portion configure to rotate about a first axis using a first hinge, the first axis parallel to an x-y plane orthogonal to a z-axis, a second z-axis portion configure to rotate about a second axis using a second hinge, the second axis parallel to the x-y plane, wherein the first z-axis portion is configured to rotate independent of the second z-axis portion.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS, 1B, 2B, and 3B illustrate generally perspective views of proof masses with split z-axis portions.

Figure 4:
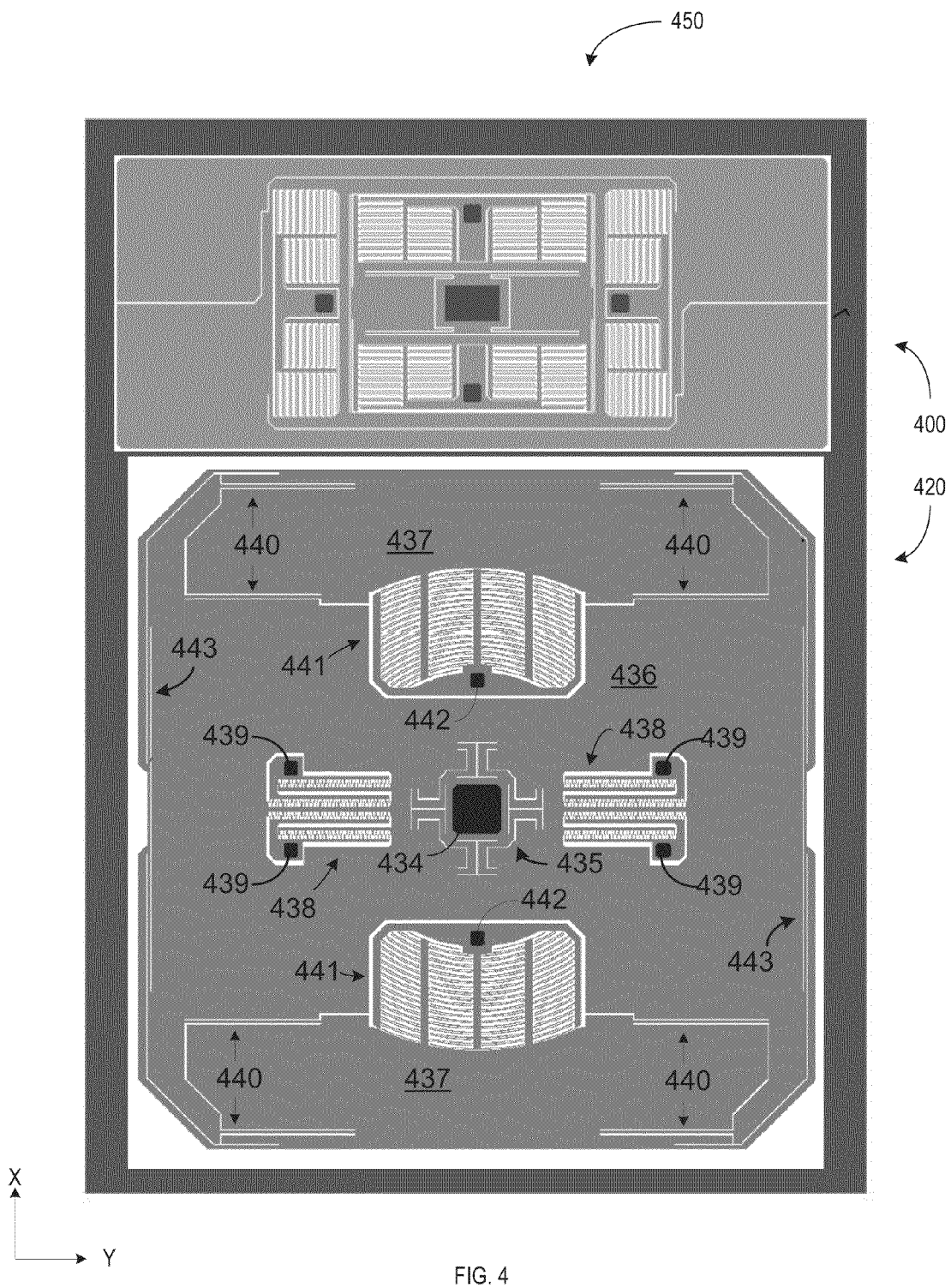

FIG. 4 illustrates generally an example gyroscope and accelerometer sensor including an accelerometer proof mass with split z-axis portions.

Figure 5:
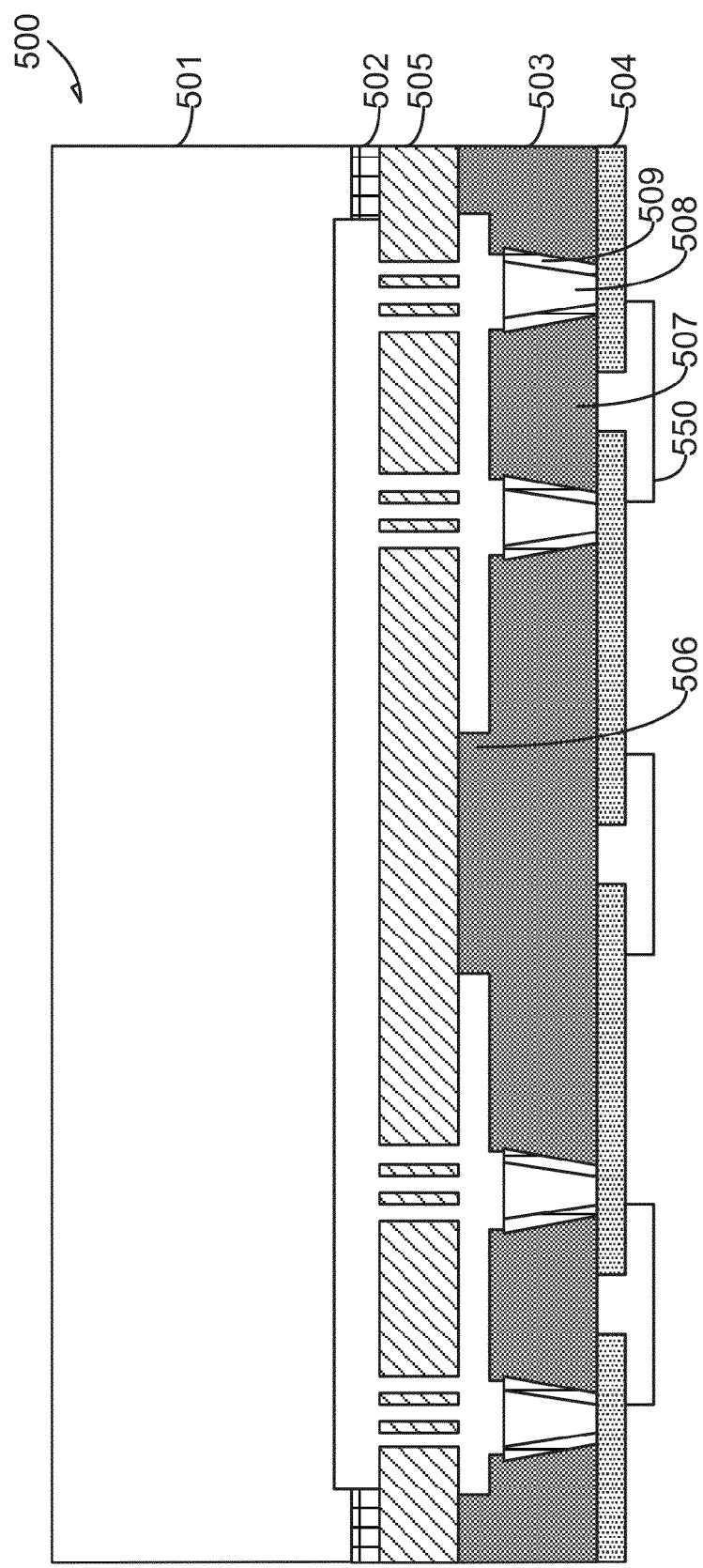

FIG. 5 illustrates generally a schematic cross sectional view of an example 3-degrees-of-freedom (3-DOF) inertial measurement unit (IMU) including an example proof mass with split z-axis portions.

DETAILED DESCRIPTION

Figure 1A:
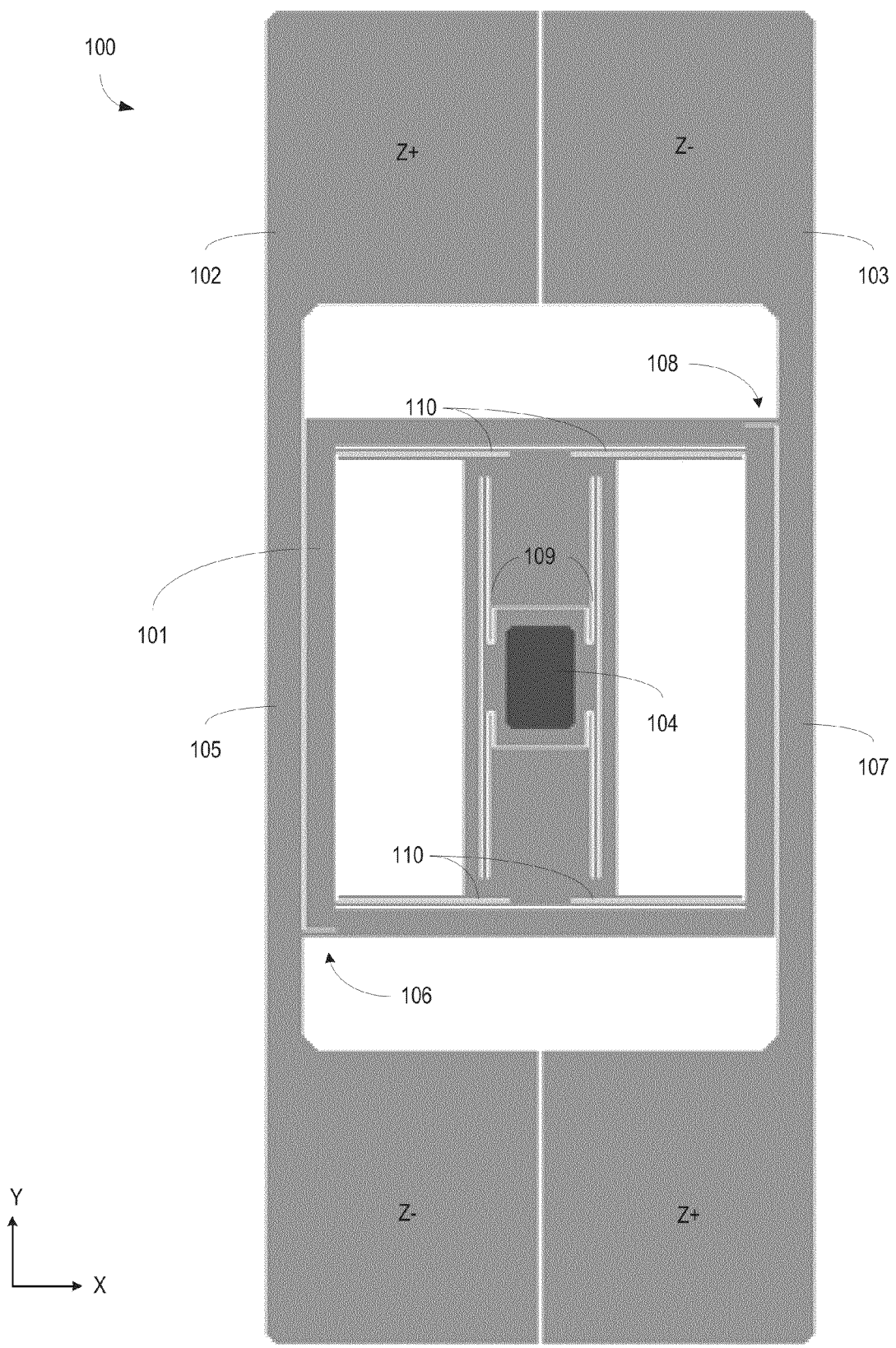
FIGS. 1A, 2A and 3A illustrate generally example proof masses with split z-axis portions.

FIG. 1A illustrates generally an example of a proof mass 100 that includes a split z-axis portion. In certain examples, the proof mass 100 can be used in a sensor for detecting acceleration. In certain examples, the proof mass 100 can be micromachined from a device layer material. For reference herein, the major surfaces of the proof mass lie in an x-y plane and a z-axis direction can be orthogonal to each x-y plane. In certain examples, a sensor can include a chip scale package wherein the proof mass 100 can be positioned between a via layer and a cap layer. In certain examples, the device layer can be positioned within a vacuum cavity between the cap layer and the via layer. The cavity can accommodate out-of-plane movement of portions of the proof mass 100. In certain examples, the proof mass 100 can include a central portion 101 and first and second z-axis portions 102, 103. In some examples, the central portion 101 can include an anchor region 104. The anchor region 104 can be used to anchor the proof mass 100 to an adjacent layer of the sensor, such as the via layer, in certain examples. In an example, a moment arm 105 of the first z-axis portion 102 can be coupled to the central portion 101 by a first hinge 106. The first hinge 106 can allow the moment arm 105 of the first z-axis portion 102 to rotate about an x-axis. In an example, a moment arm 107 of the second z-axis portion 103 can be coupled to the central portion 101 by a second hinge 108. The second hinge 108 can allow the moment arm 107 of the second z-axis portion 103 to rotate about an x-axis. Acceleration of the proof mass 100 along the z-axis can cause one or both of the z-axis proof mass portions 102, 103 to rotate about a central axis of the hinge 106, 108 coupling each z-axis portion 102, 103 to the central portion 101 of the proof mass 100. In certain examples, acceleration of the proof mass 100 along the z-axis can cause the first z-axis portion 102 to rotate in a first direction and the second z-axis portion 103 to rotate in a second direction. In an example, an end of the first z-axis portion 102 can rotate away from an adjacent end of the second z-axis portion 103 for a given acceleration along the z-axis.

In certain examples the proof mass 100 can be used to detect acceleration along multiple axes. In some examples, the proof mass can include electrodes to detect acceleration along the x and y axes. The example illustrated in FIG. 1A includes x-axis flexure bearings 109 that can respond to acceleration along an x direction, and y-axis flexure bearings 110 that can respond to acceleration along a y direction. Electrodes to detect the deformation of the x and y flexure bearings are not shown in FIG. 1A.

Figure 1B:
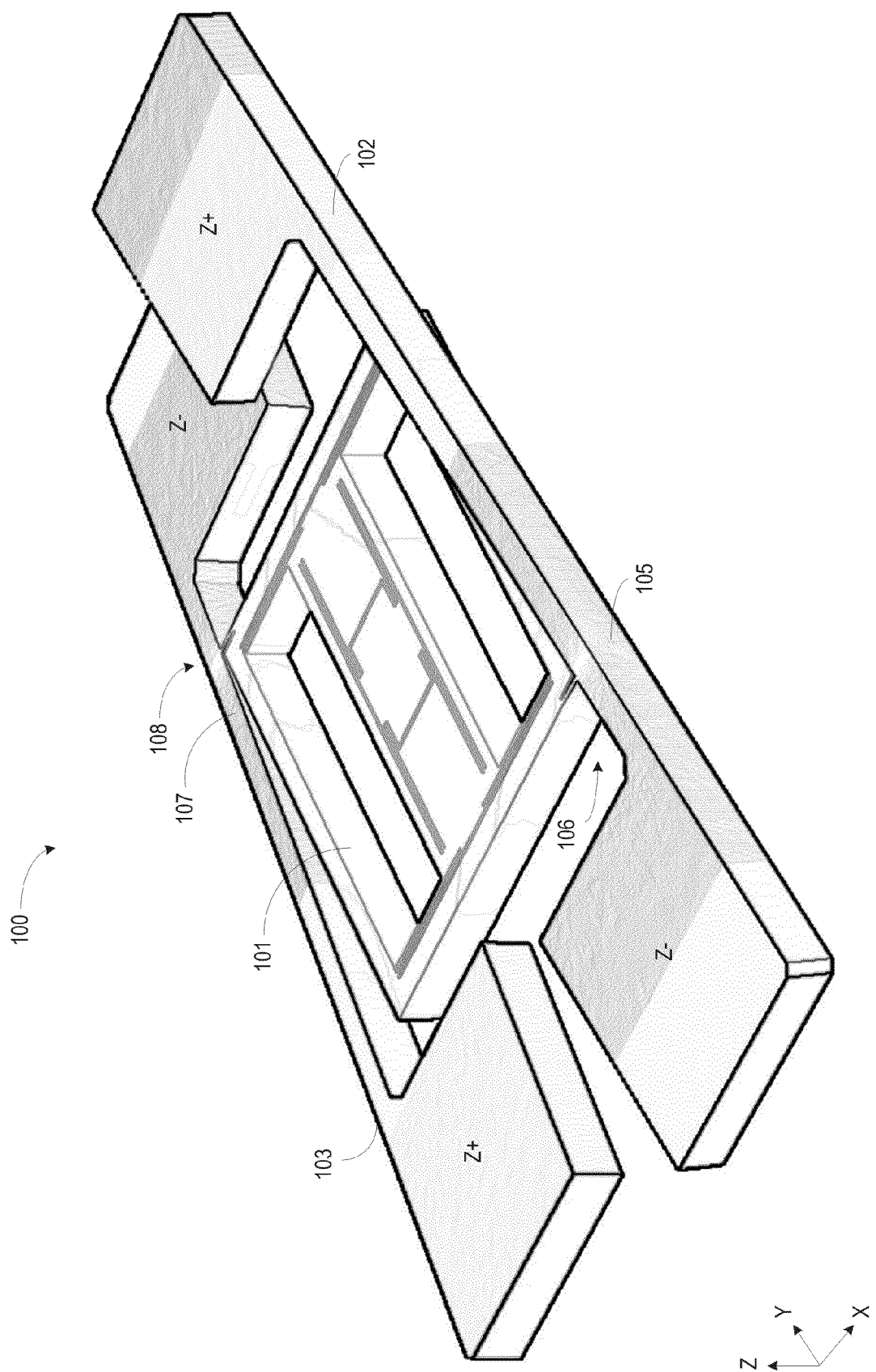

FIG. 1B illustrates a generally a perspective view of an example proof mass 100 including a split z-axis portion. The proof mass 100 includes a central portion 101, a first z-axis portion 102, a first hinge 106, a second z-axis portion 103, and a second hinge 108. The first hinge 106 can couple the moment arm 105 of the first z-axis portion to the central portion 101. The second hinge 103 can couple the moment arm 107 of the second z-axis portion 103 to the central portion 101. In the illustrated example, the second hinge 108 is located at an opposite corner of the central portion 101 from the first hinge 106. In certain examples, the hinges 106, 108 are asymmetrically coupled to their respective z-axis portion moment arm 105, 107 to allow adjacent ends of the z-axis portions 102, 103 to move in opposite, out-of-plane directions for a given acceleration along the z-axis. In certain examples, each z-axis portion 102, 103 includes a first electrode end (Z+) coupled to a second electrode end (Z−) by the moment arm 105, 107. In certain examples, an electrode can be formed at each electrode end. In some examples, a portion of an electrode can be formed on a major surface of each z-axis portion of the proof mass 100 at each electrode end. In some examples, a second portion of each electrode can be formed on the via layer near each electrode end of each z-axis portion 102, 103. Each z-axis portion 102, 103 can be associated with a pair of electrodes. In certain examples, the pairs of electrodes can be complementary. Complementary electrodes can assist in eliminating residual effects of proof mass stress that can be present during operation of the sensor, that can be present due to manufacturing variations of the proof mass, or that can be present due to assembly operations of the sensor. In certain examples, the complementary pairs of electrodes, located near the extents of the proof mass, can allow efficient cancellation of packaging and temperature effects that can cause asymmetric deformations on the opposite sides of the proof-mass. Packaging and temperature stresses that can cause different deformations on each side of the mass, can also cause asymmetric capacitance changes on each side of the proof mass. These capacitance changes can cause a net bias that the complimentary z-axis electrodes can efficiently cancel.

Figure 2A:
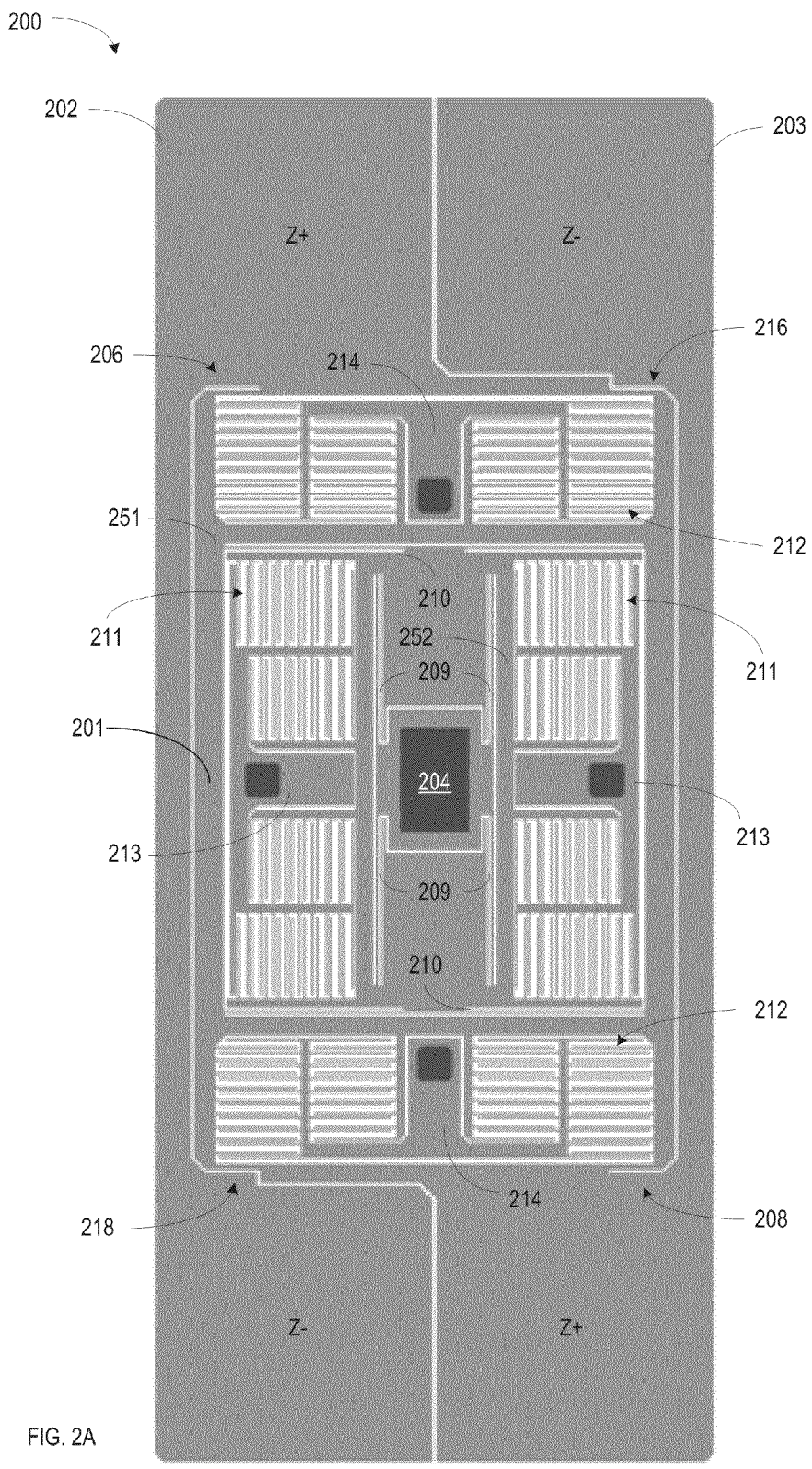

FIG. 2A illustrates generally an example proof mass 200 including split z-axis portions 202, 203, a central portion 201 and hinges 206, 216, 208, 218 for coupling the split z-axis portions 202, 203 to the central portion 201. In certain examples, the proof mass 200 can be anchored to an adjacent sensor layer via an anchor region 204 of the central portion 201 of the proof mass 200. In certain examples, the proof mass 200 can be used to measure acceleration along a z-axis using out-of-plane movement of the split z-axis portions 202, 203 of the proof mass 200. In some examples, the proof mass 200 can be used to detect acceleration along multiple axes. In some examples, the proof mass 200 can include portions of electrodes 211, 212 to detect acceleration along the x and y axes. The example proof mass of FIG. 2A includes x-axis flexure bearings 209 that can respond to acceleration along an x direction, and y-axis flexure bearings 210 that can respond to acceleration along a y direction. Electrodes to detect the deformation of the x and y flexure bearings 209, 210 can be formed, in part, using the proof mass 200, and stator structures 213, 214 anchored to an adjacent layer of an acceleration sensor. In certain examples, the split z-axis portions 203, 203 of the proof mass 200 can include a first z-axis portion 202 and a second z-axis portion 203. The first z-axis portion 202 can be coupled to the central portion 201 using a first hinge 206 and a second hinge 216. The second z-axis portion 203 can be coupled to the central portion 201 of the proof mass 200 using a third hinge 208 and a fourth hinge 218. In certain examples, the use of two hinges 206 and 216, 208 and 218 to couple one of the z-axis portions 202, 203 to the central portion 201 can make the z-axis portion more resistant to wobble or movements in the x or y directions. Movement of the split z-axis portions 202, 203 in the x or y directions can cause misalignment of the z-axis electrodes and, in turn, can lead to less accurate z-axis acceleration measurement.

In certain examples, the each pair of hinges 206 and 216, 208 and 218 can asymmetrically couple their respective z-axis portion 202, 203 to the central portion 201 to allow adjacent ends of the z-axis portions to move in opposite, out-of-plane directions for a given acceleration along the z-axis. In certain examples, each z-axis portion includes a first electrode end (Z+) and a second electrode end (Z−). In certain examples, an electrode can be formed at each electrode end. In some examples, a portion of an electrode can be formed on a major surface of each z-axis portion 202, 203 of the proof mass at each electrode end. In some examples, a second portion of each electrode can be formed on the via layer near each electrode end of each z-axis portion 202, 203. Each z-axis portion 202, 203 of the proof mass 200 can include a pair of electrodes. In certain examples, the pairs of electrodes can be complementary. Complementary electrodes can assist in eliminating residual effects of proof mass stress that can be present during operation of the sensor, can be present due to manufacturing variations of the proof mass, or can be present due to assembly operations of the sensor.

In the presence of an acceleration along the x-axis, the y-axis frame 251 and the x-axis frame 252 can move in unison with respect to the anchor region 204. The resulting motion can be detected using the x-axis accelerometer sense electrodes 211 located on opposite sides of the proof-mass, allowing differential measurement of deflections. In various examples, a variety of detection methods, such as capacitive (variable gap or variable area capacitors), piezoelectric, piezoresistive, magnetic or thermal can be used.

In the presence of an acceleration along the y-axis, the y-axis flexure bearings 210 that connect the y-axis frame 251 to the x-axis frame 252 can deflect and allow the y-axis frame 251 to move along the y-axis in unison with the proof-mass 200, while the x-axis frame 252 remains stationary. The resulting motion can be detected using the y-axis accelerometer sense electrodes 212 located on opposite sides of the proof-mass, allowing differential measurement of deflections. In various examples, a variety of detection methods, such as capacitive (variable gap or variable area capacitors), piezoelectric, piezoresistive, magnetic or thermal can be used.

Figure 2B:
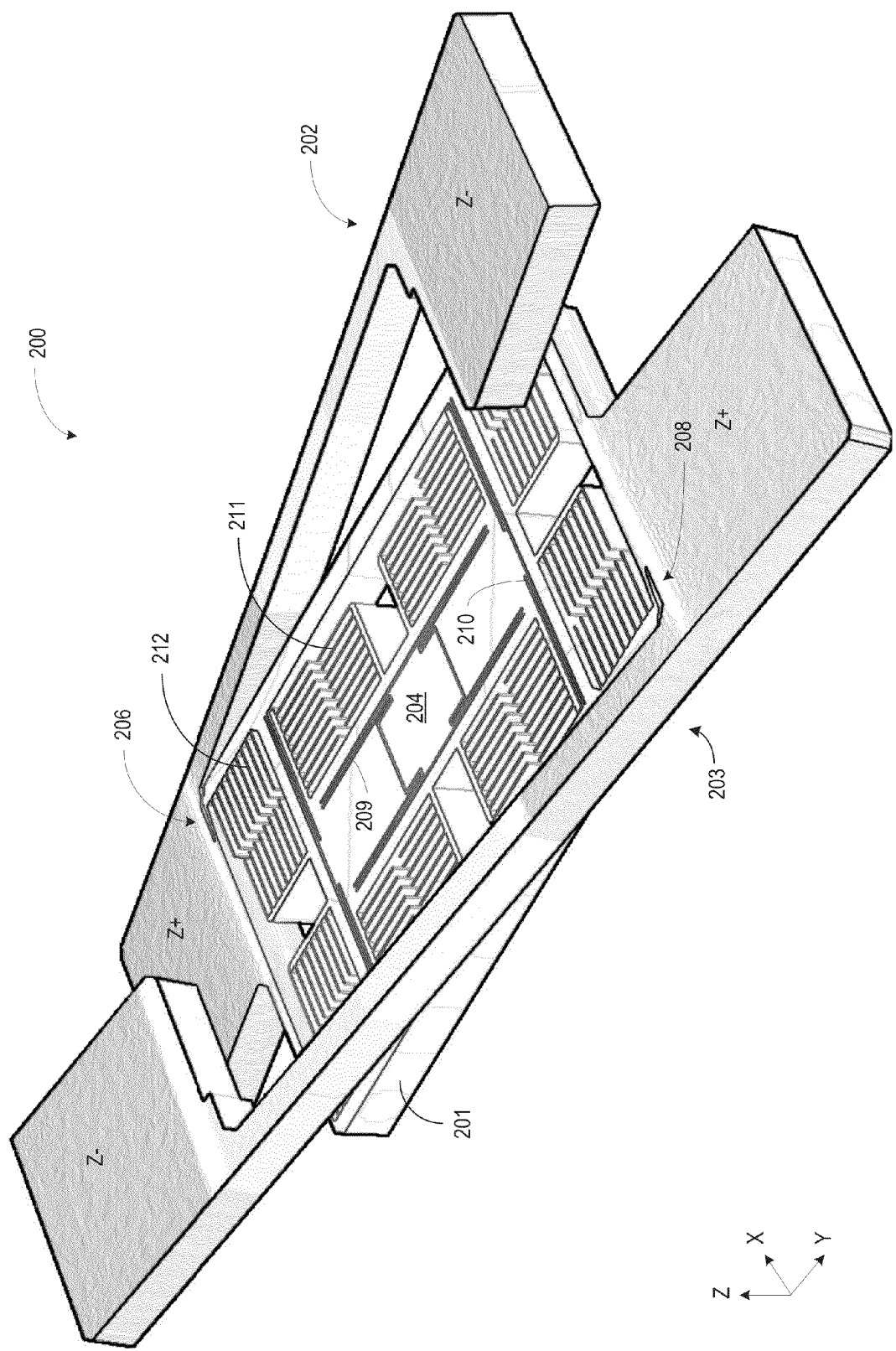

FIG. 2B illustrates generally a perspective view of an example proof mass 200 including split z-axis portions 202, 203. In certain examples, the proof mass 200 can include a central portion 201, a first z-axis portion 202, a first hinge 206, a second hinge 216 (not shown in FIG. 2B), a second z-axis portion 203, a third hinge 208, and a fourth hinge 218 (not shown in FIG. 2B). In an example, the first and second hinges 206, 216 can couple the first z-axis portion 202 to the central portion 201. In an example, the third and fourth hinges 208, 218 can couple the second z-axis portion 203 to the central portion 201. In certain examples, the third and fourth hinges 208, 218 can be located opposite the first and second hinges 206, 216 across the central portion 201 of the proof mass 200. In certain examples, the hinges 206, 216, 208, 218 can asymmetrically couple to their respective z-axis portion 202, 203 to allow adjacent ends of the z-axis portions 202, 203 to move in opposite, out-of-plane directions for a given acceleration along the z-axis. In certain examples, each z-axis portion 202, 203 includes a first electrode end (Z+) and a second electrode end (Z−). In certain examples, an electrode is formed at each electrode end. In some examples, a portion of an electrode can be formed on a major surface of each z-axis portion 202, 203 of the proof mass 200 at each electrode end. In some examples, a second portion of each electrode can be formed on the via layer near each electrode end of each z-axis portion. Each z-axis portion 202, 203 can be associated with a pair of electrodes. In certain examples, the pairs of electrodes can be complementary. Complementary electrodes can assist in eliminating residual effects of proof mass stress that can be present during operation of the sensor, can be present due to manufacturing variations of the proof mass 200, or can be present due to assembly operations of a sensor including the proof mass 200. In certain examples, the first and second z-axis portions 202, 203 can be of substantially the same shape and size. In an example, the first and second z-axis portions 202, 203 of the proof mass 200 can envelop the perimeter of the central portion 201 of the proof mass 200.

In certain examples, the proof mass 200 can include x-axis flexure bearings 209 responsive to acceleration of the proof mass 200 along the x-axis. In such examples, the proof mass 200 can include first portions 211 of x-axis electrodes configured to move in relation to second, stationary portions 213 of the x-axis electrodes. In an example, the second, stationary portions 213 (not shown in FIG. 2B) of the x-axis electrodes can be formed of the same device layer material as the proof mass 200. In certain examples, the second, stationary portions 213 of the x-axis electrodes can be anchored to an adjacent sensor layer, such as a via layer, and can include fin type structures configured to interleave with the fin type structures of the first portions 211 of the x-axis electrodes.

In certain examples, the proof mass can include y-axis flexure bearings 210 responsive to acceleration of the proof mass 200 along the y-axis. In such examples, the proof mass 200 can include first portions of y-axis electrodes 212 configured to move in relation to second, stationary portions 214 of the y-axis electrodes. In an example, the second, stationary portions 214 (not shown in FIG. 2B) of the y-axis electrodes can be formed of the same device layer material as the proof mass 200. In certain examples, the second, stationary portions 214 of the y-axis electrodes can be anchored to an adjacent sensor layer, such as a via layer, and can include fin type structures configured to interleave with the fin type structures of the first portions 212 of the y-axis electrodes.

Figure 3A:
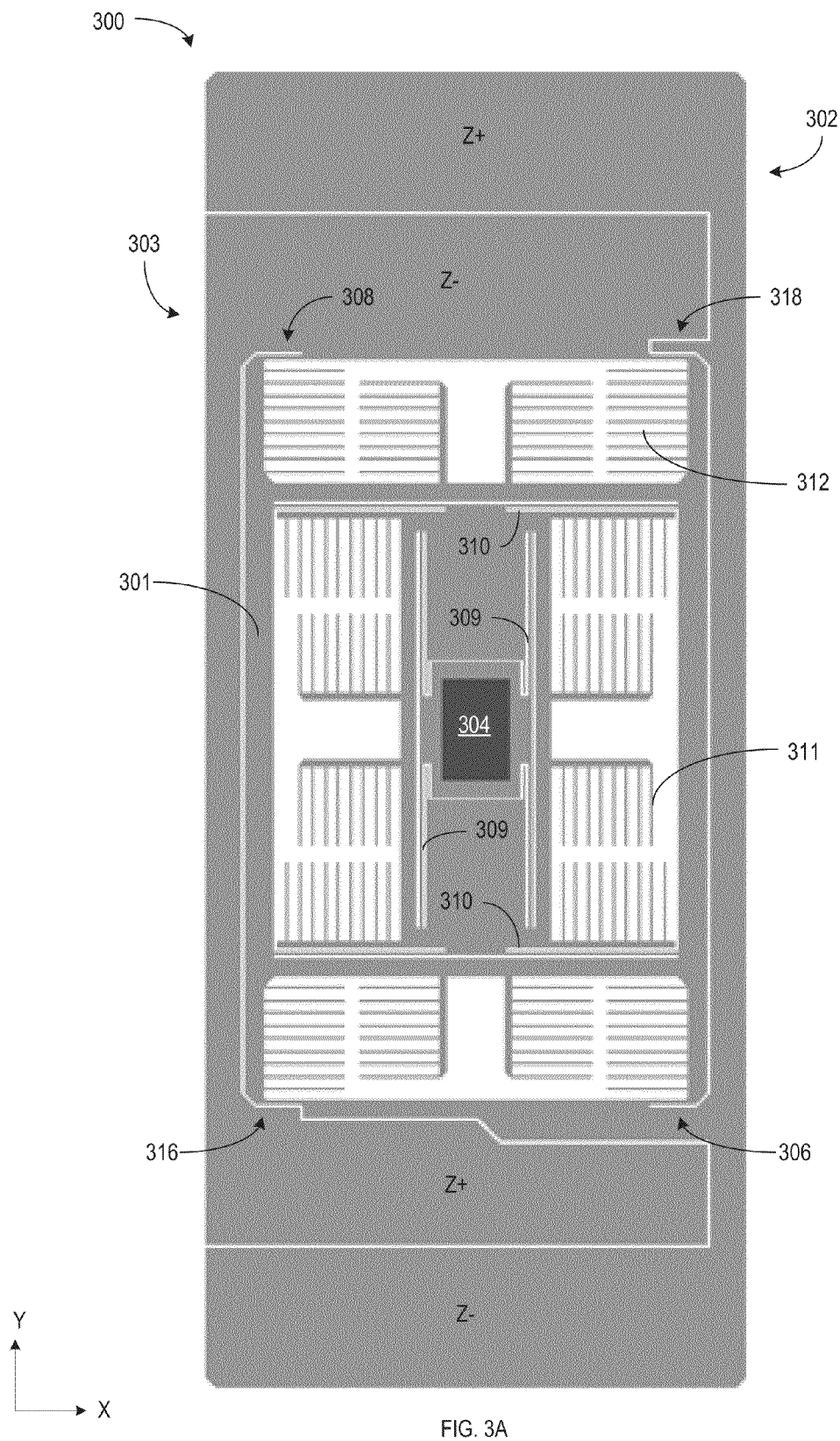

FIG. 3A illustrates generally an example proof mass 300 including a split z-axis portions 302, 303, a central portion 301 and hinges 306, 316, 308, 318 for coupling the split z-axis portions 302, 303 to the central portion 301. In certain examples, the proof mass 300 can be anchored to an adjacent sensor layer via an anchor region 304 of the central portion 301 of the proof mass 300. In certain examples, the proof mass 300 can be used to measure acceleration along a z-axis using out-of-plane movement of the split z-axis portions 302, 303 of the proof mass 300. In some examples, the proof mass 300 can be used to detect acceleration along multiple axes. In some examples, the proof mass 300 can includes portions 311, 312 of electrodes to detect acceleration along the x and y axes. In certain examples, the proof mass 300 can include x-axis flexure bearings 309 that can respond to acceleration along an x direction, and y-axis flexure bearings 310 that can respond to acceleration along a y direction. Electrodes to detect the deformation of the x and y flexure bearings 309, 310 can be formed, in part, using the proof mass 300, and stator structures (not shown) anchored to an adjacent layer of an acceleration sensor. In certain examples, the split z-axis portions 302, 303 of the proof mass 300 can include a first z-axis portion 302 and a second z-axis portion 303. The first z-axis portion 302 can be coupled to the central portion 301 using a first hinge 306 and a second hinge 316. The second z-axis portion 303 can be coupled to the central portion 301 of the proof mass 300 using a third hinge 308 and a fourth hinge 318. In certain examples, the use of two hinges to couple one of the z-axis portions to the central portion can make the z-axis portion more resistant to movement in the x and y directions. Movement in the x and y directions of the z-axis proof mass portions 302, 303 can cause misalignment of the z-axis electrodes and, in turn, can lead to less accurate z-axis acceleration measurement.

In certain examples, each pair of hinges 306 and 316, 308 and 318 can asymmetrically couple their respective z-axis portion 302, 303 to the central portion 301 to allow adjacent ends of the z-axis portions 302, 303 to move in opposite, out-of-plane directions for a given acceleration along the z-axis. In certain examples, each z-axis portion 302, 303 can include a first electrode end (Z+) and a second electrode end (Z−). In certain examples, an electrode can be formed at each electrode end. In some examples, a portion of an electrode can be formed on a major surface of each z-axis portion 302, 303 of the proof mass 300 at each electrode end. In some examples, a second portion of each electrode can be formed on the via layer near each electrode end of each z-axis portion. Each z-axis portion 302, 303 of the proof mass 300 can include a pair of electrodes. In certain examples, the two pairs of z-axis electrodes can be complementary. Complementary z-axis electrodes can assist in eliminating residual effects of proof mass stress that can be present during operation of the sensor, can be present due to manufacturing variations of the proof mass 300, or can be present due to assembly operations of a sensor including the proof mass 300.

Figure 3B:
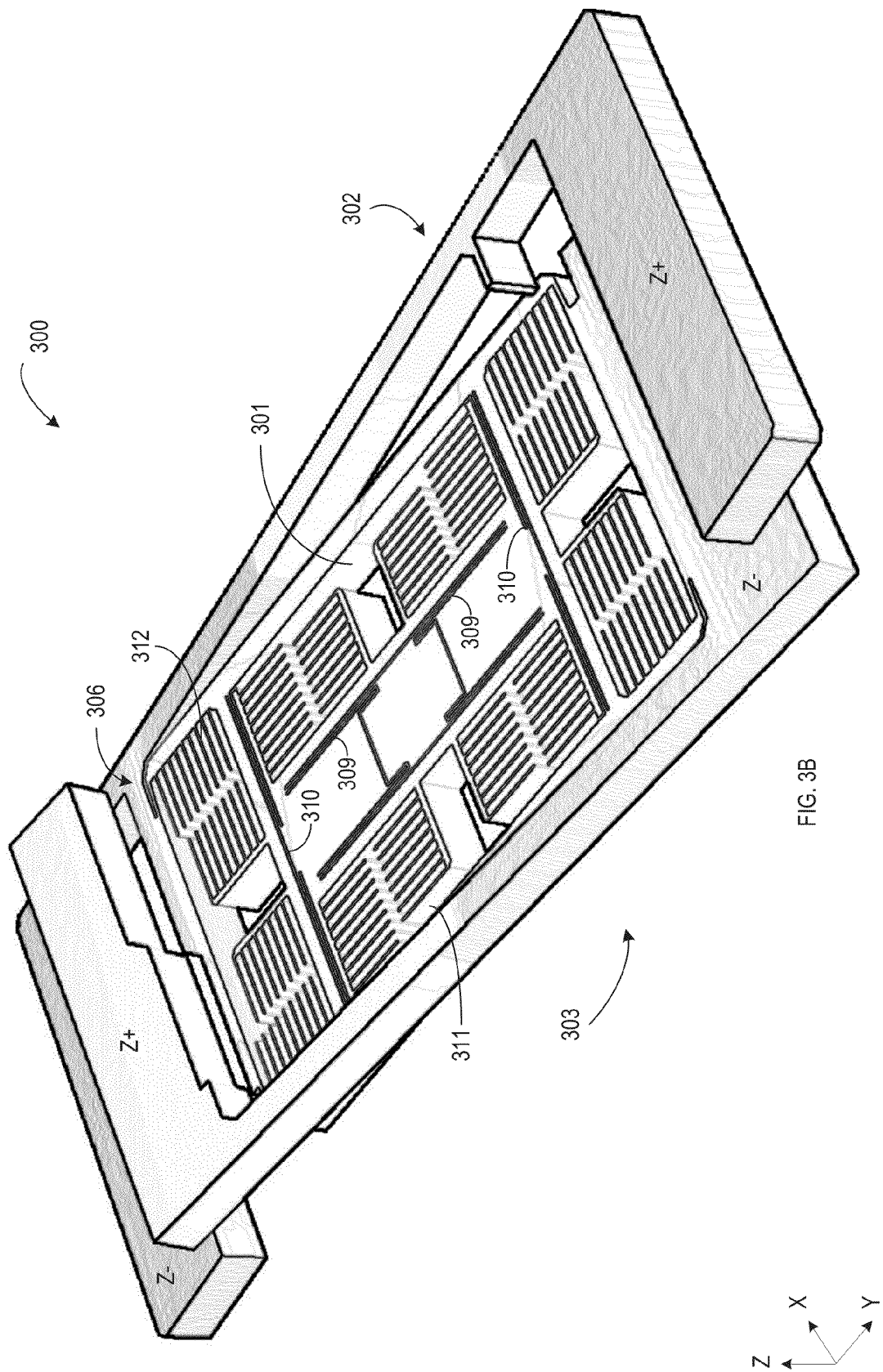

FIG. 3B illustrates generally a perspective view of an example proof mass 300 including split z-axis portions 302, 303. In certain examples, the proof mass 300 can include a central portion 301, a first z-axis portion 302, a first hinge 306, a second hinge 316, a second z-axis portion 303, a third hinge 308, and a fourth hinge 318. In an example, the first and second hinges 306, 316 can couple the first z-axis portion 302 to the central portion 301. In an example, the third and fourth hinges 308, 318 can couple the second z-axis portion 303 to the central portion 301. In certain examples, the third and fourth hinges 308, 318 can be located opposite the first and second hinges 306, 316 across the central portion 301 of the proof mass 300. In certain examples, the hinges 306, 316, 308, 318 can asymmetrically couple their respective z-axis portion 302, 303 to allow adjacent ends of the z-axis portions to move in opposite, out-of-plane directions for a given acceleration along the z-axis. In certain examples, each z-axis portion 302, 303 can include a first electrode end (Z+) and a second electrode end (Z−). In certain examples, an electrode is formed at each electrode end. In some examples, a portion of an electrode can be formed on a major surface of each z-axis portion 302, 303 of the proof mass 300 at each electrode end. In some examples, a second portion of each electrode can be formed on the via layer near each electrode end of each z-axis portion 302, 303. Each z-axis portion 302, 303 can include a pair of electrodes. In certain examples, the pairs of electrodes can be complementary. Complementary electrodes can assist in eliminating residual effects of proof mass stress that can be present during operation of the sensor, can be present due to manufacturing variations of the proof mass 300, or can be present due to assembly operations of a sensor including the proof mass 300. In an example, the first and second z-axis portions 302, 303 of the proof mass can envelop the perimeter of the central portion 301 of the proof mass 300. In an example, the first z-axis portion 302 of the proof mass 300 can envelop at least a portion of the electrode ends of the second z-axis portion 303 of the proof mass 300.

In certain examples, the proof mass 300 can include x-axis flexure bearings 309 responsive to acceleration of the proof mass 300 along the x-axis. In such examples, the proof mass 300 can include first portions 311 of x-axis electrodes configured to move in relation to second, stationary portions of the x-axis electrodes. In an example, the second, stationary portions (not shown in FIG. 3B) of the x-axis electrodes can be formed of the same device layer material as the proof mass. In certain examples, the second, stationary portions of the x-axis electrodes can be anchored to an adjacent sensor layer, such as a via layer, and can include fin type structures configured to interleave with the fin type structures of the first portions 311 of the x-axis electrodes.

In certain examples, the proof mass can include y-axis flexure bearings 310 responsive to acceleration of the proof mass 300 along the y-axis. In such examples, the proof mass 300 can include first portions 312 of y-axis electrodes configured to move in relation to second, stationary portions of the y-axis electrodes. In an example, the second, stationary portions (not shown in FIG. 3B) of the y-axis electrodes can be formed of the same device layer material as the proof mass 300. In certain examples, the second, stationary portions of the y-axis electrodes can be anchored to an adjacent sensor layer, such as a via layer, and can include fin type structures configured to interleave with the fin type structures of the first portions 312 of the y-axis electrodes.

FIG. 4 illustrates generally an example of a 3+3-degrees-of-freedom (3+3 DOF) inertial measurement unit (IMU) 450 (e.g., a 3-axis gyroscope and a 3-axis accelerometer), such as formed in a single plane of a device layer of an IMU. In an example, the 3+3 DOF can include a 3-axis gyroscope 420 and a 3-axis accelerometer 400 on the same wafer.

In this example, each of the 3-axis gyroscope 420 and the 3-axis accelerometer 400 have separate proof-masses, though when packaged, the resulting device (e.g., chip-scale package) can share a cap, and thus, the 3-axis gyroscope 420 and the 3-axis accelerometer 400 can reside in the same cavity. Moreover, because the devices can be formed at similar times and on similar materials, the invention can significantly lower the risk of process variations, can reduce the need to separately calibrate the sensors, can reduce alignment issues, and can allow closer placement of the two devices than separately bonding the devices near one another.

In addition, there can be a space savings associated with sealing the resulting device. For example, if a given seal width is used to seal each of the device individually, sharing the cap wafer and reducing the distance between devices allows the overall size of the resulting device to shrink Packaged separately, the amount of space required for the seal width could double.

In an example, the 3-axis gyroscope 420 can include a single proof-mass providing 3-axis gyroscope operational modes patterned into a device layer of the 3-DOF IMU 440.

In an example, the single proof-mass can be suspended at its center using a single central anchor (e.g., anchor 434) and a central suspension 435 including symmetrical central flexure bearings ("flexures"), such as disclosed in the copending Acar et al., PCT Patent Application Serial No. US2011052006, entitled "FLEXURE BEARING TO REDUCE QUADRATURE FOR RESONATING MICROMACHINED DEVICES," filed on Sep. 16, 2011, which is hereby incorporated by reference in its entirety. The central suspension 435 can allow the single proof-mass to oscillate torsionally about the x, y, and z axes, providing three gyroscope operational modes, including:

(1) Torsional in-plane drive motion about the z-axis;
(2) Torsional out-of-plane y-axis gyroscope sense motion about the x-axis; and
(3) Torsional out-of-plane x-axis gyroscope sense motion about the y-axis.

Further, the single proof-mass design can be composed of multiple sections, including, for example, a main proof-mass section 436 and x-axis proof-mass sections 437 symmetrical about the y-axis. In an example, drive electrodes 438 can be placed along the y-axis of the main proof-mass section 436. In combination with the central suspension 435, the drive electrodes 438 can be configured to provide a torsional in-plane drive motion about the z-axis, allowing detection of angular motion about the x and y axes.

In an example, the x-axis proof-mass sections 437 can be coupled to the main proof-mass section 436 using z-axis gyroscope flexure bearings 440. In an example, the z-axis gyroscope flexure bearings 440 can allow the x-axis proof-mass sections 437 to oscillate linear anti-phase in the x-direction for the z-axis gyroscope sense motion.

Further, the 3-axis inertial sensor 450 can include z-axis gyroscope sense electrodes 441 configured to detect anti-phase, in-plane motion of the x-axis proof-mass sections 437 along the x-axis.

In an example, each of the drive electrodes 438 and z-axis gyroscope sense electrodes 441 can include moving fingers coupled to one or more proof-mass sections interdigitated with a set of stationary fingers fixed in position (e.g., to the via wafer) using a respective anchor, such as anchors 439, 442.

In an example, the drive electrodes 438 of the gyroscope can include a set of moving fingers coupled to the main proof-mass section 436 interdigitated with a set of stationary fingers fixed in position using a first drive anchor 439 (e.g., a raised and electrically isolated portion of the via wafer). In an example, the stationary fingers can be configured to receive energy through the first drive anchor 439, and the interaction between the interdigitated moving and stationary fingers of the drive electrodes 438 can be configured to provide an angular force to the single proof-mass about the z-axis.

In an example, the drive electrodes 438 are driven to rotate the single proof-mass about the z-axis while the central suspension 435 provides restoring torque with respect to the fixed anchor 434, causing the single proof-mass to oscillate torsionally, in-plane about the z-axis at a drive frequency dependent on the energy applied to the drive electrodes 438. In certain examples, the drive motion of the single proof-mass can be detected using the drive electrodes 438.

In the presence of an angular rate about the x-axis, and in conjunction with the drive motion of the 3-axis gyroscope 420, Coriolis forces in opposite directions along the z-axis can be induced on the x-axis proof-mass sections 437 because the velocity vectors are in opposite directions along the y-axis. Thus, the single proof-mass can be excited torsionally about the y-axis by flexing the central suspension 435. The sense response can be detected using out-of-plane x-axis gyroscope sense electrodes, e.g., formed in the via wafer and using capacitive coupling of the x-axis proof-mass sections 437 and the via wafer.

In the presence of an angular rate about the y-axis, and in conjunction with the drive motion of the 3-axis gyroscope 420, Coriolis forces in opposite directions along the z-axis can be induced on the main proof-mass section 436 because the velocity vectors are in opposite directions along the x-axis. Thus, the single proof-mass can be excited torsionally about the x-axis by flexing the central suspension 435. The sense response can be detected using out-of-plane y-axis gyroscope sense electrodes, e.g., formed in the via wafer and using capacitive coupling of the main proof-mass section 436 and the via wafer.

In the presence of an angular rate about the z-axis, and in conjunction with the drive motion of the 6-axis inertial sensor 450, Coriolis forces in opposite directions along the x-axis can be induced on the x-axis proof-mass sections 437 because the velocity vectors are in opposite directions along the y-axis. Thus, the x-axis proof-mass sections 437 can be excited linearly in opposite directions along the x-axis by flexing the z-axis flexure bearings 440 in the x-direction. Further, the z-axis gyroscope coupling flexure bearings 443 can be used to provide a linear anti-phase resonant mode of the x-axis proof-mass sections 437, which are directly driven by the anti-phase Coriolis forces. The sense response can be detected using in-plane parallel-plate sense electrodes, such as the z-axis gyroscope sense electrodes 441 formed in the device layer 105.

During the anti-phase motion, the connection beams that connect the two x-axis proof-mass sections 437 to the z-axis gyroscope coupling flexure bearing 443 apply forces in the same direction and the coupling beams undergo a natural bending with low stiffness.

In contrast, during the in-phase motion, the coupling beams of the z-axis gyroscope coupling flexure bearing 443 apply forces in opposite directions on the coupling beams, forcing the coupling beams into a twisting motion with a higher stiffness. Thus, the in-phase motion stiffness and the resonant frequencies are increased, providing improved vibration rejection.

FIG. 5 illustrates generally a schematic cross sectional view of a 3-degrees-of-freedom (3-DOF) inertial measurement unit (IMU) 500, such as a 3-DOF gyroscope or a 3-DOF micromachined accelerometer, formed in a chip-scale package including a cap wafer 501, a device layer 505 including micromachined structures (e.g., a micromachined 3-DOF IMU), and a via wafer 503. In an example, the device layer 505 can be sandwiched between the cap wafer 501 and the via wafer 503, and the cavity between the device layer 505 and the cap wafer 501 can be sealed under vacuum at the wafer level.

In an example, the cap wafer 501 can be bonded to the device layer 505, such as using a metal bond 502. The metal bond 502 can include a fusion bond, such as a non-high temperature fusion bond, to allow getter to maintain long term vacuum and application of anti-stiction coating to prevent stiction that can occur to low-g acceleration sensors. In an example, during operation of the device layer 505, the metal bond 502 can generate thermal stress between the cap wafer 501 and the device layer 505. In certain examples, one or more features can be added to the device layer 505 to isolate the micromachined structures in the device layer 505 from thermal stress, such as one or more stress reducing grooves formed around the perimeter of the micromachined structures. In an example, the via wafer 503 can be bonded to the device layer 505, such as fusion bonded (e.g., silicon-silicon fusion bonded, etc.), to obviate thermal stress between the via wafer 503 and the device layer 505.

In an example, the via wafer 503 can include one or more isolated regions, such as a first isolated region 507, isolated from one or more other regions of the via wafer 503, for example, using one or more through-silicon-vias (TSVs), such as a first TSV 508 insulated from the via wafer 503 using a dielectric material 509. In certain examples, the one or more isolated regions can be utilized as electrodes to sense or actuate out-of-plane operation modes of the 6-axis inertial sensor, and the one or more TSVs can be configured to provide electrical connections from the device layer 505 outside of the system 500. Further, the via wafer 503 can include one or more contacts, such as a first contact 550, selectively isolated from one or more portions of the via wafer 503 using a dielectric layer 504 and configured to provide an electrical connection between one or more of the isolated regions or TSVs of the via wafer 503 to one or more external components, such as an ASIC wafer, using bumps, wire bonds, or one or more other electrical connection.

In certain examples, the 3-degrees-of-freedom (3-DOF) gyroscope or the micromachined accelerometer in the device layer 505 can be supported or anchored to the via wafer 503 by bonding the device layer 505 to a protruding portion of the via wafer 503, such as an anchor 506. In an example, the anchor 506 can be located substantially at the center of the via wafer 503, and the device layer 505 can be fusion bonded to the anchor 506, such as to eliminate problems associated with metal fatigue.

Additional Notes

In Example 1, a proof mass, for an accelerometer for example, can include a center portion configured to anchor the proof-mass to an adjacent layer, a first z-axis portion configure to rotate about a first axis using a first hinge, the first axis parallel to an x-y plane orthogonal to a z-axis, a second z-axis portion configure to rotate about a second axis using a second hinge, the second axis parallel to the x-y plane; wherein the first z-axis portion is configured to rotate independent of the second z-axis portion.

In Example 2, the first z-axis portion of Example 1 optionally is configured to rotate in an opposite direction than that of the second z-axis portion in response to an acceleration of the proof mass along the z-axis.

In Example 3, the first hinge of any one or more of Examples 1-2 optionally is located opposite the second hinge with respect to the central portion.

In Example 4, the first hinge of any one or more of Examples 1-3 optionally is coupled to the first z-axis portion closer to a first end of the first z-axis portion than a second end of the first z-axis portion.

In Example 5, the second hinge of any one or more of Examples 1-4 optionally is coupled to the second z-axis portion closer to a first end of the second z-axis portion than a second end of the axis z-axis portion.

In Example 6, the proof mass of any one or more of Examples 1-5 optionally includes a third hinge, wherein the first z-axis portion is configured to rotate about the first axis in the x-y plane using the first hinge and the third hinge.

In Example 7, the proof mass of any one or more of Examples 1-6 optionally includes a fourth hinge, wherein the second z-axis portion is configured to rotate about the second axis in the x-y plane using the second hinge and the fourth hinge.

In Example 8, the central portion of any one or more of Examples 1-7 optionally includes an anchor portion and an x-axis proof mass portion, the x-axis proof mass portion configured to deflect, with respect to the anchor portion, in response to an acceleration of the proof mass along the x-axis.

In Example 9, the central portion of any one or more of Examples 1-8 optionally includes a y-axis proof mass portion, the y-axis proof mass portion configured to deflect, with respect to the anchor portion, in response to an acceleration of the proof mass along the y-axis.

In Example 10, the first z-axis portion and the second z-axis portion of any one or more of Examples 1-9 optionally substantially envelop the central portion in the x-y-plane.

In Example 11, a method can include accelerating a proof mass along a z-axis direction, rotating a first z-axis portion of the proof mass in a first rotational direct about a first axis lying in an x-y-plane using a first hinge, the rotation of the first z-axis portion of the proof mass responsive to the acceleration of the proof mass in the z-axis direction, and rotating a second z-axis portion of the proof mass in a second rotational direct about a second axis lying in an x-y-plane using a second hinge, the rotation of the second z-axis portion of the proof mass responsive to the acceleration of the proof mass in the z-axis direction. The first rotational direction can be opposite the second rotational direction using a point of reference outside a perimeter of the proof mass.

In Example 12, an apparatus can include a single proof mass accelerometer, the single proof mass accelerometer including a single proof mass formed in the x-y plane of a device layer, the single proof mass including, a central portion including a single, central anchor, a first z-axis portion configure to rotate about a first axis in the x-y plane using a first hinge, the first hinge coupled to the central portion, and a second z-axis portion configure to rotate about a second axis in the x-y plane using a second hinge, the second hinge coupled to the central portion. The first z-axis portion can be configured to rotate independent of the second z-axis portion. The single central anchor can be configured to suspend the single proof-mass. The central portion can include separate x, y, axis flexure bearings, wherein the x and y-axis flexure bearings are symmetrical about the single, central anchor.

In Example 13, the central portion of any one or more of Examples 1-12 optionally includes in-plane x and y-axis accelerometer sense electrodes symmetrical about the single, central anchor.

In Example 14, the single proof mass of any one or more of Examples 1-13 optionally includes a first portion of first and second out-of-plane z-axis accelerometer sense electrodes coupled to the first z-axis portion, and a first portion of third and fourth out-of-plane z-axis sense electrodes coupled to the second z-axis portion.

In Example 15, the apparatus of any one or more of Examples 1-14 optionally includes a cap wafer bonded to a first surface of the device layer, and a via wafer bonded to a second surface of the device layer, wherein the cap wafer and the via wafer are configured to encapsulate the single proof mass accelerometer in a cavity.

In Example 16, the via wafer of any on or more of Examples 1-15 optionally includes a second portion of the first and second out-of-plane z-axis accelerometer sense electrodes, and a second portion of the third and fourth out-of-plane z-axis sense electrodes.

In Example 17, the apparatus of any one or more of Examples 1-16 optionally includes a first portion of x-axis accelerometer electrodes coupled to the device layer, wherein the central portion of the single proof mass includes a second portion of the x-axis accelerometer electrodes, the second portion of the x-axis electrodes coupled to the single central anchor using the x flexure bearings.

In Example 18, the apparatus of any one or more of Examples 1-17 optionally includes a first portion of y-axis accelerometer electrodes coupled to the device layer, and the central portion of the single proof mass includes a second portion of the y-axis accelerometer electrodes, the second portion of the y-axis electrodes coupled to the single central anchor using the y flexure bearings.

In Example 19, The apparatus of any one or more of Examples 1-18 optionally includes a multiple-axis gyroscope within the cavity and adjacent the single proof mass accelerometer. The multiple-axis gyroscope optionally includes a second single proof-mass formed in the x-y plane of the device layer. The second single proof-mass can include a main proof-mass section suspended about a second single, central anchor, the main proof-mass section including a radial portion extending outward towards an edge of the multiple-axis gyroscope, a central suspension system configured to suspend the second single proof mass from the single, central anchor, and a drive electrode including a moving portion and a stationary portion, the moving portion coupled to the radial portion, wherein the drive electrode and the central suspension system are configured to oscillate the single proof mass about the z-axis normal to the x-y plane at a drive frequency.

In Example 20, wherein the second, single proof mass of any one or more of Examples 1-19 optionally includes symmetrical x-axis proof-mass sections configured to move anti-phase along the x-axis in response to z-axis angular motion.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. In some examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A proof-mass for an accelerometer, the proof mass comprising:
   a center portion configured to anchor the proof-mass to an adjacent layer;
   a first z-axis portion of the proof mass configured to rotate about a first axis using a first hinge, the first axis parallel to an x-y plane orthogonal to a z-axis;
   a second z-axis portion of the proof mass configured to rotate about a second axis using a second hinge, the second axis parallel to the x-y plane;
   wherein the first z-axis portion is configured to rotate independent of the second z-axis portion; and wherein the central portion includes an anchor portion and an x-axis proof mass portion, the x-axis proof mass portion configured to deflect, with respect to the anchor portion, in response to an acceleration of the proof mass along the x-axis.

2. The proof mass of claim 1, wherein the first z-axis portion is configured to rotate in an opposite direction than that of the second z-axis portion in response to an acceleration of the proof mass along the z-axis.

3. The proof mass of claim 1, wherein the first hinge is located opposite the second hinge with respect to the central portion.

4. The proof mass of claim 1, wherein the first hinge is coupled to the first z-axis portion closer to a first end of the first z-axis portion than a second end of the first z-axis portion.

5. The proof mass of claim 1, wherein the second hinge is coupled to the second z-axis portion closer to a first end of the second z-axis portion than a second end of the axis z-axis portion.

6. The proof mass of claim 1, including a third hinge, wherein the first z-axis portion is configured to rotate about the first axis in the x-y plane using the first hinge and the third hinge.

7. The proof mass of claim 1, including a fourth hinge, wherein the second z-axis portion is configured to rotate about the second axis in the x-y plane using the second hinge and the fourth hinge.

8. The proof mass of claim 1, wherein the central portion includes a y-axis proof mass portion, the y-axis proof mass portion configured to deflect, with respect to the anchor portion, in response to an acceleration of the proof mass along the y-axis.

9. The proof mass of claim 1 wherein the first z-axis portion and the second z-axis portion substantially envelop the central portion in the x-y-plane.

10. An apparatus comprising:
a single proof mass accelerometer, the single proof mass accelerometer including:
a proof mass structure formed in the x-y plane of a device layer, the proof mass structure including:
a central portion including:
a single, central anchor, configured to suspend the proof mass structure ; and
separate x and y, flexure bearings, wherein the x and y-axis flexure bearings are symmetrical about the single, central anchor;
a first z-axis portion configured to rotate about a first axis in the x-y plane using a first hinge, the first hinge coupled to the central portion;
a second z-axis portion configure to rotate about a second axis in the x-y plane using a second hinge, the second hinge coupled to the central portion;
wherein the first z-axis portion is configured to rotate independent of the second z-axis portion.

11. The apparatus of claim 10, wherein the central portion includes in-plane x and y-axis accelerometer sense electrodes symmetrical about the single, central anchor.

12. The apparatus of claim 10, wherein the proof mass structure includes:
a first portion of first and second out-of-plane z-axis accelerometer sense electrodes coupled to the first z-axis portion, and
a first portion of third and fourth out-of-plane z-axis sense electrodes coupled to the second z-axis portion.

13. The apparatus of claim 12, including:
a cap wafer bonded to a first surface of the device layer; and
a via wafer bonded to a second surface of the device layer, wherein the cap wafer and the via wafer are configured to encapsulate the single proof mass accelerometer in a cavity.

14. The apparatus of claim 13, wherein the via wafer includes:
a second portion of the first and second out-of-plane z-axis accelerometer sense electrodes, and
a second portion of the third and fourth out-of-plane z-axis sense electrodes.

15. The apparatus of claim 14, including a first portion of x-axis accelerometer electrodes coupled to the device layer, and
wherein the central portion of the proof mass structure includes a second portion of the x-axis accelerometer electrodes, the second portion of the x-axis accelerometer electrodes coupled to the single central anchor using the x flexure bearings.

16. The apparatus of claim 14, including a first portion of y-axis accelerometer electrodes coupled to the device layer, and
wherein the central portion of the proof mass structure includes a second portion of the y-axis accelerometer electrodes, the second portion of the y-axis accelerometer electrodes coupled to the single central anchor using the y flexure bearings.

17. The apparatus of claim 13, including a multiple-axis gyroscope within the cavity and adjacent the single proof mass accelerometer, the multiple-axis gyroscope including:
a single gyroscope proof mass formed in the x-y plane of the device layer, the single gyroscope proof mass including:
a main proof-mass section suspended about a second single, central anchor, the main proof-mass section extending outward towards an edge of the multiple-axis gyroscope;
a central suspension system configured to suspend the single gyroscope proof mass from the single, central anchor; and
a drive electrode including a moving portion and a stationary portion, the moving portion including a first set of fingers interdigitated with a second set of fingers of the stationary portion, wherein the drive electrode and the central suspension system are configured to oscillate the single gyroscope proof mass about the z-axis normal to the x-y plane at a drive frequency.

18. The apparatus of claim 17, wherein the single gyroscope proof mass includes symmetrical x-axis proof-mass sections configured to move anti-phase along the x-axis in response to z-axis angular motion.

* * * * *